US009898255B2

(12) United States Patent
Osterhoff et al.

(10) Patent No.: US 9,898,255 B2
(45) Date of Patent: Feb. 20, 2018

(54) GRID DESIGNER FOR MULTIPLE CONTEXTS

(71) Applicants: Johannes Osterhoff, Heidelberg (DE); Hans-Peter Schaerges, Mannheim (DE); Irina Goetzenberger, Heidelberg (DE); Gerard Keane, Wiesloch-Walldorf (DE)

(72) Inventors: Johannes Osterhoff, Heidelberg (DE); Hans-Peter Schaerges, Mannheim (DE); Irina Goetzenberger, Heidelberg (DE); Gerard Keane, Wiesloch-Walldorf (DE)

(73) Assignee: SAP SE, Walldorf (DE)

( * ) Notice: Subject to any disclaimer, the term of this patent is extended or adjusted under 35 U.S.C. 154(b) by 610 days.

(21) Appl. No.: 14/188,290

(22) Filed: Feb. 24, 2014

(65) Prior Publication Data
US 2015/0135104 A1    May 14, 2015

Related U.S. Application Data

(60) Provisional application No. 61/903,751, filed on Nov. 13, 2013.

(51) Int. Cl.
*G06F 9/44*    (2018.01)
(52) U.S. Cl.
CPC ..................... *G06F 8/20* (2013.01)
(58) Field of Classification Search
CPC ........ G06F 9/4443; G06F 8/38; G06F 3/0481; G06F 8/34; G06F 9/45512
See application file for complete search history.

(56) References Cited

U.S. PATENT DOCUMENTS

| | | | |
|---|---|---|---|
| 6,324,511 B1* | 11/2001 | Kiraly .................. | G09B 21/006 704/260 |
| 6,564,186 B1* | 5/2003 | Kiraly .................. | G09B 21/006 704/260 |
| 7,673,245 B2 | 3/2010 | Weddeling et al. | |
| 7,895,522 B2 | 2/2011 | Wong et al. | |
| 8,370,757 B2 | 2/2013 | Tinari et al. | |
| 8,402,379 B2 | 3/2013 | Barak | |
| 8,416,267 B2 | 4/2013 | Park et al. | |
| 8,533,614 B2 | 9/2013 | Katsumata | |
| 8,584,034 B2 | 11/2013 | Holt et al. | |

(Continued)

*Primary Examiner* — Andrey Belousov
*Assistant Examiner* — Haimei Jiang
(74) *Attorney, Agent, or Firm* — Fish & Richardson P.C.

(57) ABSTRACT

The disclosure generally describes computer-implemented methods, software, and systems for interacting with a UI design in a first context and automatically performing and previewing related interactions with the UI design in at least one other context. A computer-implemented method includes, in one example, presenting a user interface (UI) layout for a first context in a primary display and a UI layout for at least one additional context in a secondary display. A modification to a UI element in the first context is identified, and a corresponding modification to the UI layout in at least one of the additional contexts based on the modification is made. The determined modification to the UI layout in at least one of the additional contexts is performed, and updated UI layouts for the first context in the primary display and the at least one additional context in the secondary display are presented.

19 Claims, 18 Drawing Sheets

(56) References Cited

U.S. PATENT DOCUMENTS

| | | | |
|---|---|---|---|
| 8,671,352 B1* | 3/2014 | Hsu | G06F 3/0484 |
| | | | 715/238 |
| 9,092,240 B2* | 7/2015 | Bhatt | G06F 9/4443 |
| 9,699,199 B2* | 7/2017 | Van Brink | H04L 63/14 |
| 9,740,293 B2* | 8/2017 | Kramer | G06F 3/017 |
| 2003/0227482 A1 | 12/2003 | Bach et al. | |
| 2004/0015893 A1* | 1/2004 | Banavar | G06F 9/4443 |
| | | | 717/138 |
| 2005/0195221 A1* | 9/2005 | Berger | G06F 3/0481 |
| | | | 345/660 |
| 2006/0184348 A1* | 8/2006 | Schattka | G06F 8/38 |
| | | | 703/22 |
| 2008/0120538 A1* | 5/2008 | Kurz | G06F 17/30905 |
| | | | 715/255 |
| 2011/0099494 A1 | 4/2011 | Yan et al. | |
| 2011/0175867 A1* | 7/2011 | Satake | H04N 5/44591 |
| | | | 345/204 |
| 2012/0144326 A1 | 6/2012 | Werner | |
| 2012/0198365 A1 | 8/2012 | Bornheimer et al. | |
| 2013/0061151 A1 | 3/2013 | Perry | |
| 2013/0067430 A1 | 3/2013 | Mayer-Ullmann | |
| 2013/0145257 A1* | 6/2013 | Shalabi | G06F 17/248 |
| | | | 715/243 |
| 2013/0174015 A1* | 7/2013 | Jeff | G06F 17/30905 |
| | | | 715/234 |
| 2013/0318454 A1 | 11/2013 | Gilboa | |
| 2014/0019892 A1 | 1/2014 | Mayerhofer | |
| 2014/0164944 A1* | 6/2014 | Sivakumar | G06F 17/30905 |
| | | | 715/746 |
| 2014/0282229 A1* | 9/2014 | Laukkanen | G06F 3/0481 |
| | | | 715/788 |
| 2014/0289667 A1* | 9/2014 | Van Vliembergen | |
| | | | G06F 3/04842 |
| | | | 715/781 |
| 2016/0065505 A1* | 3/2016 | Iskander | G06F 3/0488 |
| | | | 715/752 |
| 2016/0328215 A1* | 11/2016 | Osterhoff | G06F 8/34 |

* cited by examiner

GRID DESIGNER FOR MULTIPLE CONTEXTS

CLAIM OF PRIORITY

This application claims priority under 35 USC § 119(e) to U.S. Patent Application Ser. No. 61/903,751 filed on Nov. 13, 2013 the entire contents of which are hereby incorporated by reference.

BACKGROUND

Application and user interface (UI) design previously required developers to identify a single design that could be used on similar platforms and displays. As more types of displays have been commonly used to perform tasks associated with a single application or web page, developers must individually create new application layouts and UI designs for each new display and/or device.

SUMMARY

The disclosure generally describes computer-implemented methods, software, and systems for interacting with a UI design in a first context and automatically performing and previewing related interactions with the UI design in at least one other context. A computer-implemented method includes, in one example, presenting a user interface (UI) layout for a first context in a primary display and a UI layout for at least one additional context in a secondary display. A modification to a UI element in the first context is identified, and a corresponding modification to the UI layout in at least one of the additional contexts based on the modification is made. The determined modification to the UI layout in at least one of the additional contexts is performed, and updated UI layouts for the first context in the primary display and the at least one additional context in the secondary display are presented.

While generally described as computer implemented software embodied on tangible and non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
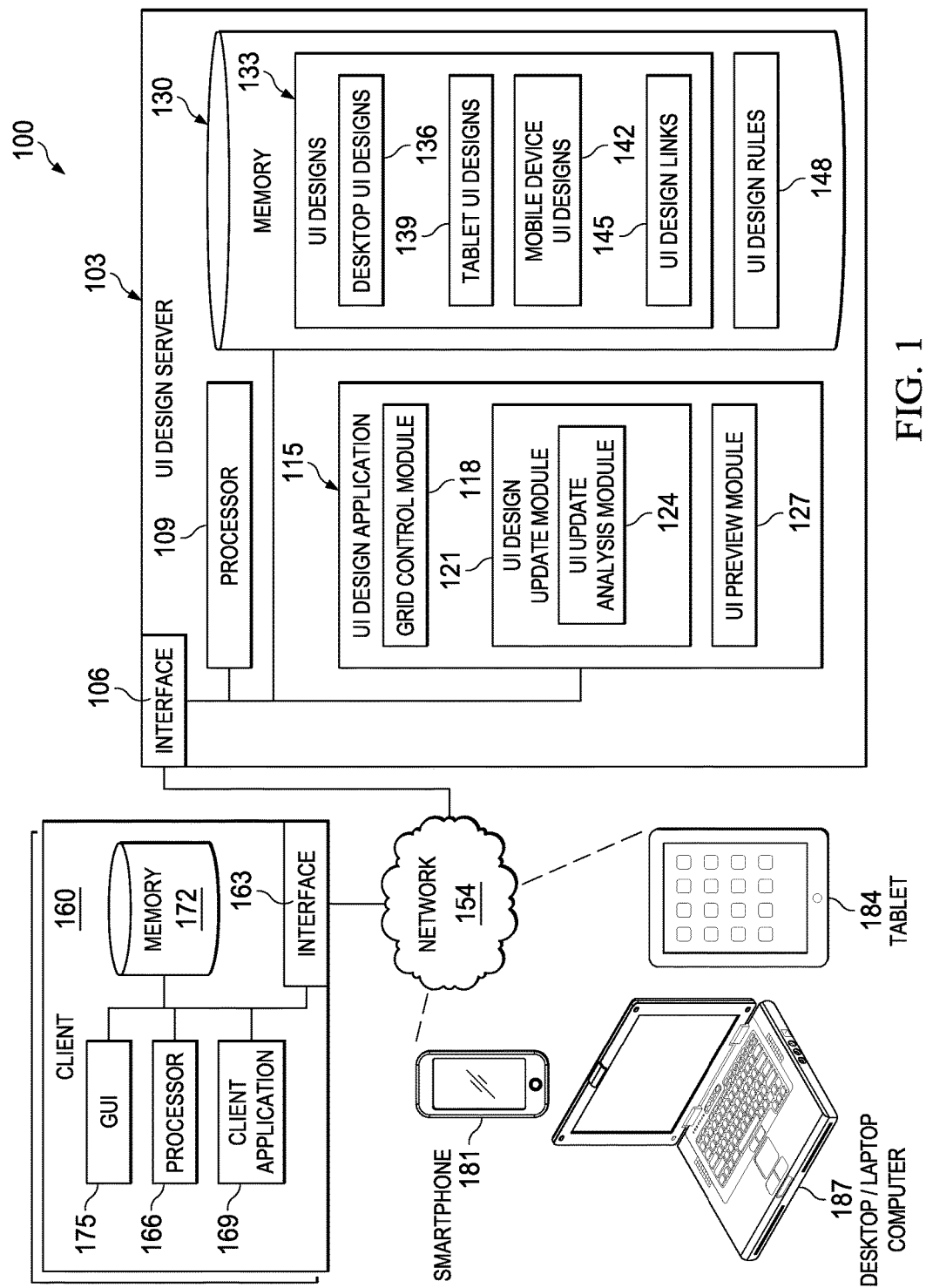
FIG. 1 illustrates an example of a computer system environment for creating a UI design in a first context, while concurrently presenting a preview of one or more related UI designs in at least one other context.

The present application relates to the design, modification, management of UI designs for various related device contexts associated with a single application or web page. For example, the present application may relate to a rich internet application (RIA) or other design tool that facilitates users in laying out a content structure for various device contexts (e.g., desktop, tablet, and mobile, among others) in a single location and presentation. In one implementation, the present application may be based on a Responsive Grid control for HTML5 (e.g., SAP UI5—an SAP library based on HTML5 and JavaScript). The grid designer makes the features of this control visible in a graphical user interface (GUI) and lets users export the code (HTML and UI5/JavaScript) for the responsive UI layouts they designed.

One of the main issues with comparable systems it that it is not apparent how changes of the layout in the currently represented device context (e.g. desktop) will affect or modify other device-specific contexts (e.g., tablet or phone). This disconnect can lead to tedious interactions for users in having to repetitiously switch between device contexts to track changes, apply modifications, and determine the effect of a particular operation, addition, or deletion. The present disclosure describes solving this issue by several decisions in the user interface. In particular, a preview area avoids such a repetition by displaying at least one other device context and its particular rendering of the UI layout. Using the preview, it is made possible to see the effect of modifications, deletions, additions, and other actions on both the currently selected device or presentation context and any other contexts provided in the preview area.

The present disclosure provides, among other solutions, a method of interaction used when designing UI layouts for various size and types of displays and device contexts at the same time. In one instance, the grid designer allows developers to design foundational layout structures for different screen real estates (e.g. desktop computer screens (~1280 pixels wide); tablet computer screens (~1000 pixels wide); and smartphone screens (~320 pixels wide)) at the same time. Additionally, the present disclosure may provide layouts for different types of layouts or orientations for the same device, such as a portrait and landscape orientation of tablets and smartphones. Currently, such tasks require increasing complexity for a single context. With the increasing number of devices and device types, the ability to build UI layouts in multiple contexts at once can greatly simplify the design process. In particular, the present solution supports the concurrent design activities in multiple contexts by providing the developer with an awareness of how an element is displayed in other contexts and how changes in the currently visible context will affect the others.

The present solution provides this awareness of multiple device contexts by including multiple elements in a single GUI, including a canvas, a settings panel, and a preview area. The canvas shows the responsive grid control and is subdivided into a 12 column grid layout. The column grid layout may be subdivided into any suitable number of columns, and the illustrated example is not meant to be limiting. Buttons on top of the canvas can be used to switch between different contexts and show grids similar to those as they would be presented on the corresponding device or in the corresponding orientation. When loaded, the UI layout for the particular context spreads over the corresponding screen width to represent the corresponding layout. For example, a desktop layout may correspond to a "large" button, and the layout may stretch across the entire width of the screen. By activating buttons for either "medium" or "small" contexts, as well as other suitable labeling, the grid can adapt the width of the canvas to resemble the screen layout for tablet computers and smartphones.

The foundational layout structure is represented by horizontal blocks (or UI elements) that can be spanned over various amounts of columns of this grid. Users can select one of the blocks and modify its behavior by changing the related display values in the settings panel. In some instances, grids can be nested (e.g., by double-clicking a particular block or UI element. In those instances, an empty canvas can then show the nested area inside the particular UI element. A user can navigate through nested grids with the breadcrumb navigation located above the canvas.

A settings panel can be available to present the settings for the currently selected block. In some instances, the settings panel can be presented in the lower left area of the screen. The settings may include multiple values, each corresponding to the currently selected block or UI element and its linked versions in the current context and at least one other context. For example, a presentation associated with a large, medium and small device context may present three values when a particular block or UI element is selected, each corresponding to one of the device contexts. Additionally, the device context currently presented in the canvas may be highlighted or otherwise distinguished to provide easier recognition for the user. Example settings may include a "span" setting that defines the amount of columns the currently selected block should span across, an "indent" value setting the amount of empty space to the left of the currently selected block or UI element, and a "line break" checkbox to determine whether to create a new line before the selected block. In some instances, the settings panel may include the options to hide or freely move blocks within one or more of the corresponding device contexts. For example, a smartphone or tablet context may include an explicit "back" button or UI element, as mobile browsers may not explicitly include such functionality. However, a desktop version may instead hide such a box, as desktop browsers typically include such functionality.

A preview area may be provided (e.g., in the lower right area of the screen) to present reduced or miniature versions of some or all of the corresponding device contexts. In some instances, only the non-selected contexts may be provided (i.e., excluding the currently selected context presented in the canvas), while in other instances, the currently selected context may be provided along with the at least one other context. In response to selecting one of these contexts from the preview area, the canvas can update to display the corresponding device context. The width and aspect ratios of the different contexts in the preview area resemble the corresponding device contexts to provide an illustration of the various context differences.

The blocks constituting the layout on the canvas are also displayed in the preview area. When the behavior of a block is modified via the settings panel, the block's representation in the preview area is also updated. Using the preview area, then, the user can maintain an overview of any changes to the various device contexts—i.e., not only on the currently selected device context presented on the canvas, but also the remaining contexts presented in preview area. Additionally, the blocks and UI elements are linked to each other throughout the various contexts. For example, when the user hovers over one of the blocks, all the representations of the same block are highlighted (e.g., via a linking and brushing interaction). Using this interconnection, users can monitor each version and context of the UI layout and design to identify how certain behaviors in one context affect the other contexts.

Example modifications to one context that can be reflected in other contexts, including those shown in the preview panel, can include the addition of a new block to a design, the removal or deletion of a particular block from the design (i.e., in all contexts), the modification of a particular block from a single context, the movement of a particular block from one location in the design in a particular context to another, as well as others. Regarding the movement of a block, such changes may create a ripple change in at least one of the other contexts. Any such changes may be reflected in the context representations included in the preview pane.

Restating the advantages of the described solution, the grid designer and the described methods can be used to lay out a content structure for various device contexts, such as desktop/laptop, tablet, and mobile contexts. The solution can make features of this control visible in a graphical user interface (GUI), while letting users export the code in multiple formats (e.g. HTML5, JavaScript, XML, etc.) for the responsive layouts they designed. Some sample use cases can help to understand the advantages of the present disclosure over existing solutions.

So far, application designers had to use custom CSS or JavaScript to define the responsive behavior of controls. This process not only required expertise in these technologies, but it was also time-consuming and repetitive—the definitions had to be done by each application designer for each context of the application. The solution provides a custom set of rules that fit the majority of use cases regarding the layout of controls. The present solution eliminates redundant work and therefore also helps to save time.

For user experience (UX) designers and developers, it has become easier to speak a common language and better connect across these different disciplines. For example, a UX designer could specify the layout of an application via the solution, export the code defining the various layout contexts, and provide the code to the responsible developer. During the further process, the UX designer and developer could prototype and refine the specification with help of the described tools and immediately determine how the changes affect the layout across all layouts and contexts.

FIG. 1 illustrates an example of a computer system environment 100 for creating a UI design in a first context, while concurrently presenting a preview of one or more related UI designs in at least one other context. Specifically, the illustrated environment 100 includes or is communicably coupled with a UI design server 103, one or more clients 160, a network 154, and one or more devices (smartphone 181, desktop/laptop computer 187, and tablet 184).

In general, the UI design server 103 is a server, set of servers, or other computers that provide UI design services in association with one or more applications, websites, and other online locations. In particular, the UI design server 103 includes a UI design application 115 as described herein, which can provide developers with a unified and concurrent view of multiple contexts associated with a particular UI layout. By providing a concurrent view of multiple contexts, the effects of modifications to a particular UI layout context can be immediately determined for the one or more other contexts of the UI layout. The UI design server 103 can interact with one or more clients 160, where the clients 160 are used to modify and update particular UI designs 133. The UI design server 103 and its UI design application 115 can perform operations associated with designing and modifying UI layouts in response to requests received from users in environment 100, and can further respond accordingly. In some implementations, the UI design server 103 may store and execute one or more additional processes (not shown), in addition to the operations related to the UI design operations (via the UI design application 115), as well as other types of processes and/or applications. In other implementations, the UI design server 103 may be a dedicated system or server only meant to execute operations associated with the UI design application 115. In some implementations, the UI design server 103 may comprise a Web server, where the UI design application 115 represents one or more Web-based services and/or applications accessed and executed by clients 160 and their applications via the network 154 or directly at the UI design server 103 to perform the programmed tasks or operations of the UI design application 115.

At a high level, the UI design server 103 comprises an electronic computing device operable to receive, transmit, process, store, or manage data and information associated with the environment 100. Specifically, the UI design server 103 illustrated in FIG. 1 is responsible for receiving user modifications, additions, deletions, and other changes to one or more UI designs 133 in a first context, and subsequently determining how said modifications and changes affect one or more related contexts. Those changes are then presented to the user, providing an understanding of how different changes affect related contexts. In addition to requests from the external clients 160, requests associated with the UI design process may also be sent from internal, or local, users, external or third-party customers, automated applications or processes, employees, as well as any other appropriate entities, individuals, systems, or computers.

As used in the present disclosure, the term "computer" is intended to encompass any suitable processing device. For example, although FIG. 1 illustrates a single UI design server 103, environment 100 can be implemented using two or more such systems, a plurality of servers as well as computers other than servers, including a server pool. Indeed, UI design server 103 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated UI design server 103 may be adapted to execute any operating system, including Linux, UNIX, Windows, Mac OS®, Java™, Android™, iOS or any other suitable operating system. According to one implementation, the UI design server 103 may also include or be communicably coupled with an e-mail server, a Web server, a caching server, and/or other suitable server or computer.

In the present illustration, the UI design server 103 hosts and/or supports the UI design application 115 and its associated engines, modules, and processes, which include a grid control module 118, a UI design update module 121, and a UI preview module 127, among others. As described, the UI design server 103 receives one or more modifications from users (e.g., via clients 160) associated with a particular UI design or layout. In some instances, the UI design application 115 can be associated with a WYSIWYG ("What You See Is What You Get") editor, allowing for changes to be made to the underlying UI layout in a particular context. The UI design application 115 is supported by a grid control module 118, which can provide a grid-based design tool to allow for easy designing of UIs. In some instances, the UI design application 115 may be an expansion or version of SAP's Grid Designer application. The grid control module 118 may provide a foundation in a responsive grid control for UI5 (an SAP library based on HTML5 and JavaScript). Any other suitable solutions, applications, processes, etc. may also be associated therewith.

The UI design application 115 is also illustrated as including a UI design update module 121. The UI design update module 121 can be used to identify the modifications received by the UI design application 115 for a particular context of the associated UI layout. The UI design update module 121 can include a UI update analysis module 124, which identifies, in response to the particular modification received, which other contexts associated with the particular context are affected by the modification, as well as what those modifications would be. The UI update analysis module 124 may access a set of UI design rules 148 (illustrated in memory 130) which define how certain modifications may affect different contexts. For example, the addition of a new UI element in a particular context of a UI layout may cause the addition of corresponding new UI elements in corresponding contexts of the UI layout. Similarly, a change to an ordering of UI elements in one context may affect the ordering of corresponding UI elements in at least one related context. The UI update analysis module 124 can determine what corresponding changes should be made, and the UI design update module 121 can, in some cases, perform those determined changes to be made in the other contexts.

The UI design application 115 is also illustrated as included a UI preview module 127. The UI preview module 127 may be responsible, or can assist in, presenting both a primary view of a selected context for a UI layout in a primary pane or display area within the UI design application 115 and a set of previews for one or more related contexts. These previews can illustrate the layouts of one or more related contexts for the current UI layout, and further, can provide visual feedback to identify related UI elements, illustrate how changes affect other contexts, and provide information on how one or more UI elements in various contexts are related or linked.

As illustrated, the UI design server 103 includes an interface 106, a processor 109, and a memory 130. The interface 106 is used by the UI design server 103 for communicating with other systems in a distributed environment—including within the environment 100—connected to the network 154, for example, one of the clients 160, as well as other systems communicably coupled to the network 154 (including those not illustrated). Generally, the interface 106 comprises logic encoded in software and/or hardware in a suitable combination and operable to communicate with the network 154. More specifically, the interface 106 may comprise software supporting one or more communication protocols associated with communications, such that the network 154 or the interface's hardware is operable to communicate physical signals within and outside of the illustrated environment 100.

As illustrated in FIG. 1, the UI design server 103 includes a processor 109. Although illustrated as a single processor 109 in FIG. 1, two or more processors may be used according to particular needs, desires, or particular implementations of the environment 100. Each processor 109 may be a central processing unit (CPU), a blade, an application specific integrated circuit (ASIC), a field-programmable gate array (FPGA), or another suitable component. Generally, the processor 109 executes instructions and manipulates data to perform the operations of the UI design server 103. Specifically, the processor 109 executes the functionality required to receive and respond to requests from the various devices, including the execution of the UI design application 115.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The UI design server 103 includes a memory (or multiple memories) 130. The memory 130 may include any type of memory or database module and may take the form of volatile and/or non-volatile memory including, without limitation, magnetic media, optical media, random access memory (RAM), read-only memory (ROM), removable media, or any other suitable local or remote memory component. The memory 130 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the UI design server 103. Additionally, the memory 130 may include any other appropriate data, such as VPN applications, firmware logs and policies, firewall policies, a security or access log, print or other reporting files, as well as others.

As illustrated, memory 130 includes a set of UI designs 133. The UI designs 133 may be of various perspectives, and may include desktop UI layout designs 136, tablet UI designs 139, and mobile device UI designs 142, among others. As described, many of these designs may be related, and may represent the same UI layout represented in different perspectives. While illustrated as separated by device type, in some implementations the various UI layouts and designs may be stored together, separately, or in any suitable fashion. Additionally, various UI layouts may have multiple contexts associated with various formats, including different orientations in the same device, may include contexts for only a particular subset of device types, or may be separated within device types by particular models, operating systems, or other suitable filter or distinction. The set of UI designs 133 also includes a set of UI design links 145. These links may assist in defining relationships between various UI designs, for example, between a particular desktop UI design 136 and a particular tablet UI design 139. The UI design links 145 may be embedded with or included in the stored designs, may be separately stored, or may be available in any suitable way to link the different designs and perspectives.

Memory 130 also includes the UI design rules 148. These UI design rules 148 may include one or more rules defining how related contexts should be presented. In one example, the UI design rules 148 may specify how a desktop context for a UI layout may be provided in a tablet layout. These rules can define, at least initially, how a modification to a particular UI layout in one context can affect and change the UI layout in a second context. These rules may be used to perform the automatic updates to the contexts other than the context currently being displayed.

Network 154 facilitates wireless or wireline communications between the components of the environment 100 (i.e., between the UI design server 103 and the one or more clients 160), as well as with any other local or remote computer, such as additional clients, servers, or other devices communicably coupled to network 154, including those not illustrated in FIG. 1. In the illustrated environment, the network 154 is depicted as a single network, but may be comprised of more than one network without departing from the scope of this disclosure, so long as at least a portion of the network 154 may facilitate communications between senders and recipients. In some instances, one or more of the components associated with the UI design server 103 may be included within network 154 as one or more cloud-based services or operations. For example, at least a portion of the UI design server 103 may be within the network 154, and operated at least partially within or as a cloud-based system, including, in some instances, multiple remote processors performing the operations described herein.

The network 154 may be all or a portion of an enterprise or secured network, while in another instance, at least a portion of the network 154 may represent a connection to the Internet. In some instances, a portion of the network 154 may be a virtual private network (VPN). Further, all or a portion of the network 154 can comprise either a wireline or wireless link. Example wireless links may include 802.11a/b/g/n, 802.20, WiMax, LTE, and/or any other appropriate wireless link. In other words, the network 154 encompasses any internal or external network, networks, sub-network, or combination thereof operable to facilitate communications between various computing components inside and outside the illustrated environment 100. The network 154 may communicate, for example, Internet Protocol (IP) packets, Frame Relay frames, Asynchronous Transfer Mode (ATM) cells, voice, video, data, and other suitable information between network addresses. The network 154 may also include one or more local area networks (LANs), radio access networks (RANs), metropolitan area networks (MANs), wide area networks (WANs), all or a portion of the Internet, and/or any other communication system or systems at one or more locations.

The illustrated environment of FIG. 1 also includes the client 160 and one or more devices (i.e., smartphone 181, desktop/laptop computer 187, and tablet 184) upon which the UI being designed will be viewed. Each of these devices may be any computing device operable to connect to or communicate with at least the UI design server 103 via the network 154 using a wireline or wireless connection. In general, the devices and client 160 comprise electronic computer devices operable to receive, transmit, process, and store any appropriate data associated with the environment 100 of FIG. 1. These devices/systems can connect to the UI design server 103 either directly or with the help of a client-based wrapper. Connections between the clients/servers and the UI design server 103 can be established, for instance, using HTTP or RFC protocols depending on client technologies and implementation preferences.

Each client 160 may be any device suitable to view and execute web pages and operations associated with the UI design server 103. Further, the client 160 may include a graphical user interface (GUI) 175. The GUI 175 interfaces with at least a portion of the environment 100 for any suitable purpose, including generating a visual representation of the UI design application 115 and its editing operations. In some instances, the GUI 175 may be associated with a Web browser or other client application, including client application 169. The GUI 175 may be used to view and navigate various Web pages located both internally and externally to the UI design server 103. The GUI 175 may comprise a graphical user interface operable to, for example, allow the user of the client 160 to interface with at least a portion of the UI design server 103, as well as other applications. Generally, the GUI 175 provides the particular associated user with an efficient and user-friendly presentation of data provided by or communicated within the system. The GUI 175 may comprise a plurality of customizable frames or views having interactive fields, pull-down lists, and buttons operated by the user. Generally, the GUI 175 may also provide general interactive elements that allow a user to access and utilize various services and functions of one or more applications, such as links or buttons associated with submitting particular content items as potentially inappropriate. The GUI 175 may present information associated with the respective applications for viewing and interaction. In general, the GUI 175 is often configurable, supports a combination of tables and graphs (bar, line, pie, status dials, etc.), and is able to build real-time portals, where tabs are delineated by key characteristics (e.g., site or micro-site). Therefore, the GUI 175 contemplates any suitable graphical user interface, such as a combination of a generic web browser, intelligence engine, and command line interface (CLI) that processes information in the platform and efficiently presents the results to the user associated with the client 160 visually.

As illustrated, client 160 may include an interface 163, processor 166, and memory 172 similar, respectively, to interface 106, processor 109, and memory 130. Additionally, client 160 may include client application 169. Client application 169 may be a client-side version of the UI design application 115, as well as a web browser capable of accessing and interacting with the UI design application 115. Generally, the client application 169 can be used to perform modifications and changes to a particular UI layout or series of UI layouts, while viewing the changes occurring as a result of these changes in the particular context in which the changes are made as well as other related contexts.

There may be any number of client or mobile devices associated with, or external to, the environment 100. For example, while the illustrated environment 100 includes one client 160, alternative implementations of the environment 100 may include multiple clients communicably coupled to the network, or any other number suitable to the purposes of the environment 100. Additionally, there may also be one or more additional clients external to the illustrated portion of the environment 100 that are capable of interacting with the environment 100 via the network 154. Further, the term "user" and "developer" and "designer" may be used interchangeably as appropriate without departing from the scope of this disclosure. Moreover, while the client 160 is described in terms of being used by a single user, this disclosure contemplates that many users may use one computer or that one user may use multiple computers.

While FIG. 1 is described as containing or being associated with a plurality of elements, not all elements illustrated within environment 100 of FIG. 1 may be utilized in each alternative implementation of the present disclosure. For example, although FIG. 1 depicts a particular environment 100, any suitable alternative environments and implementations are considered. Additionally, one or more of the elements described herein may be located external to environment 100, while in other instances, certain elements may be included within, or as a portion of, one or more of the other described elements, as well as other elements not described in the illustrated implementation. Further, certain elements illustrated in FIG. 1 may be combined with other components, as well as used for alternative or additional purposes in addition to those purposes described herein.

Figure 2:
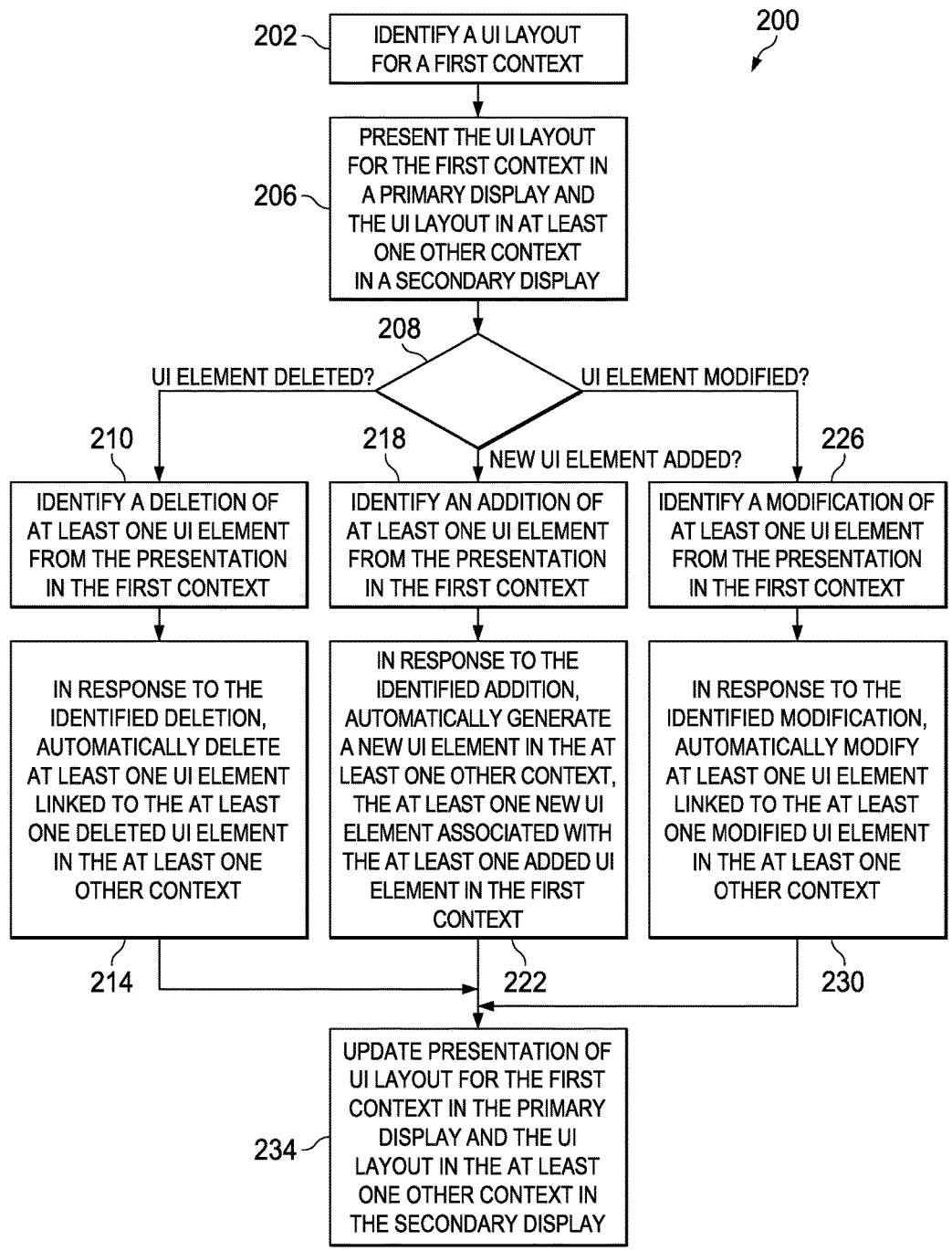
FIG. 2 illustrates a flow diagram describing an example method for interacting with a UI design in a first context and automatically performing and previewing related interactions with the UI design in at least one other context.

FIG. 2 illustrates a flow diagram describing an example method 200 for interacting with a UI design in a first context and automatically performing and previewing related interactions with the UI design in at least one other context. For clarity of presentation, the description that follows generally describes method 200 in the context of FIG. 1. However, it will be understood that method 200 may be performed, for example, by any other suitable system, environment, software, and hardware, or a combination of systems, environments, software, and hardware, as appropriate.

At 202, a UI layout for a first context is identified. At 206, the UI layout in the first context is presented in a primary display, while at least one other context associated with the UI layout is presented in a secondary display. The primary display may be a relatively larger display than the secondary display, where the first context is presented in a size relatively similar to that in which it would be normally presented. In some instances, the at least one other context may include contexts associated with a different device than the first context, while in other instances, the at least one other context may include a context associated with a different orientation than the first context, while on a similar device. The different devices may include a desktop computer, a laptop computer, a tablet computer, a smartphone, as well as other suitable devices. Further, the orientations may include a portrait orientation or a landscape orientation, as well as others. Still further, the different contexts may be based on different operating systems, web browsers, application types, users, user types, user roles, user responsibilities, and others.

At 208, a determination is made as to what type of modification or interaction with the presented first context is made. If a UI element included in the first context is deleted, method 200 continues at 210, where the deletion of at least one UI element from the presented first context is identified. At 214, in response to the identified deletion, at least one UI element linked to or associated with the at least one deleted UI element is automatically deleted from at least one other context. The link between the deleted UI element in the first context and the at least one other context may be defined based on a set of UI design rules, and may be used to provide consistent layouts among multiple contexts. For example, a particular UI element field may be included in both a desktop layout and a mobile layout. When the UI element field is deleted or otherwise removed from the desktop layout, the corresponding UI element field included in the mobile layout may also be deleted or otherwise removed to provide a consistent UI layout across contexts.

Once the linked UI element is removed from the at least one other context, method 200 continues at 234, where the presentation of the UI layout for the first context in the primary display and the UI layout in the at least one other context in the secondary display are updated. The update of the UI layouts may be performed concurrently, and can illustrate to the user the effect of changes on each of the related contexts. The secondary display can be a preview pane used to provide concurrent illustrations and explanation of how changes to the first context in the primary display affect the at least one context by presenting those changes in the secondary display.

Returning to 208, if the determination is made that the modification is the addition of a new UI element to the UI layout in the first context, method 200 continues at 218, where the addition is identified. At 222, in response to the identified addition, a new UI element is automatically generated in at least some of the at least one other contexts. Further, the newly added UI element in the first context of the UI layout are linked to, or associated with, the newly added UI elements in the at least one other context. This allows any future modifications to those particular UI elements in one of the contexts to be applied similarly to the related UI elements in the other contexts. In some instances, the rules governing newly added UI elements may determine that some related contexts may not automatically add a new UI element in response to the addition. This may include situations where the newly added UI element is specific to a particular display or device context. For example, a mobile context may need to add a "back" button, while such functionality may be included within the inherent capabilities of a desktop context. The rules may specify such omissions and changes, as well as other rules governing the new UI element to be added. For example, different types of UI elements (i.e., "back" buttons, input fields, dropdown boxes, etc.) may be associated with default and user- or admin-defined rules which dictate how corresponding elements should be added. The rules may define the particular relationship between contexts and how certain UI elements are modified. In some instances, the newly added UI element in the at least one other context may not be identical to newly added UI element from the first context. Alternative suitable permutations may occur based on the defined rule set. The method then continues at 234, where the presentation of the UI layout for the first context is updated in the primary display to reflect the addition, while the presentation of the UI layout for the at least one other context is updated in the secondary display to reflect the corresponding additions.

Returning to 208, if the determination is made that a particular already-existing UI element is modified in the first context, method 200 continues at 226, where the modification is identified. In response to the modification, at least one UI element in at least one other context linked to or associated with the modified UI element in the first context is automatically modified. Similar to the addition of 222, the modifications may be based on a defined rule set identifying how changes in one context may affect linked or associated UI elements in a different context. In some instances, certain modifications to a UI element in a first context may not cause changes to occur to one or more linked UI elements. For example, if a tab or indentation is added in a desktop context to a particular UI element, a corresponding tab or indentation may not be needed in a corresponding mobile context. If an automatic modification is warranted, the modification will be made. Method 200 continues at 234, where the presentation of the UI layout in both the first and at least one other context are updated in the primary and secondary displays, respectively.

Figure 3:
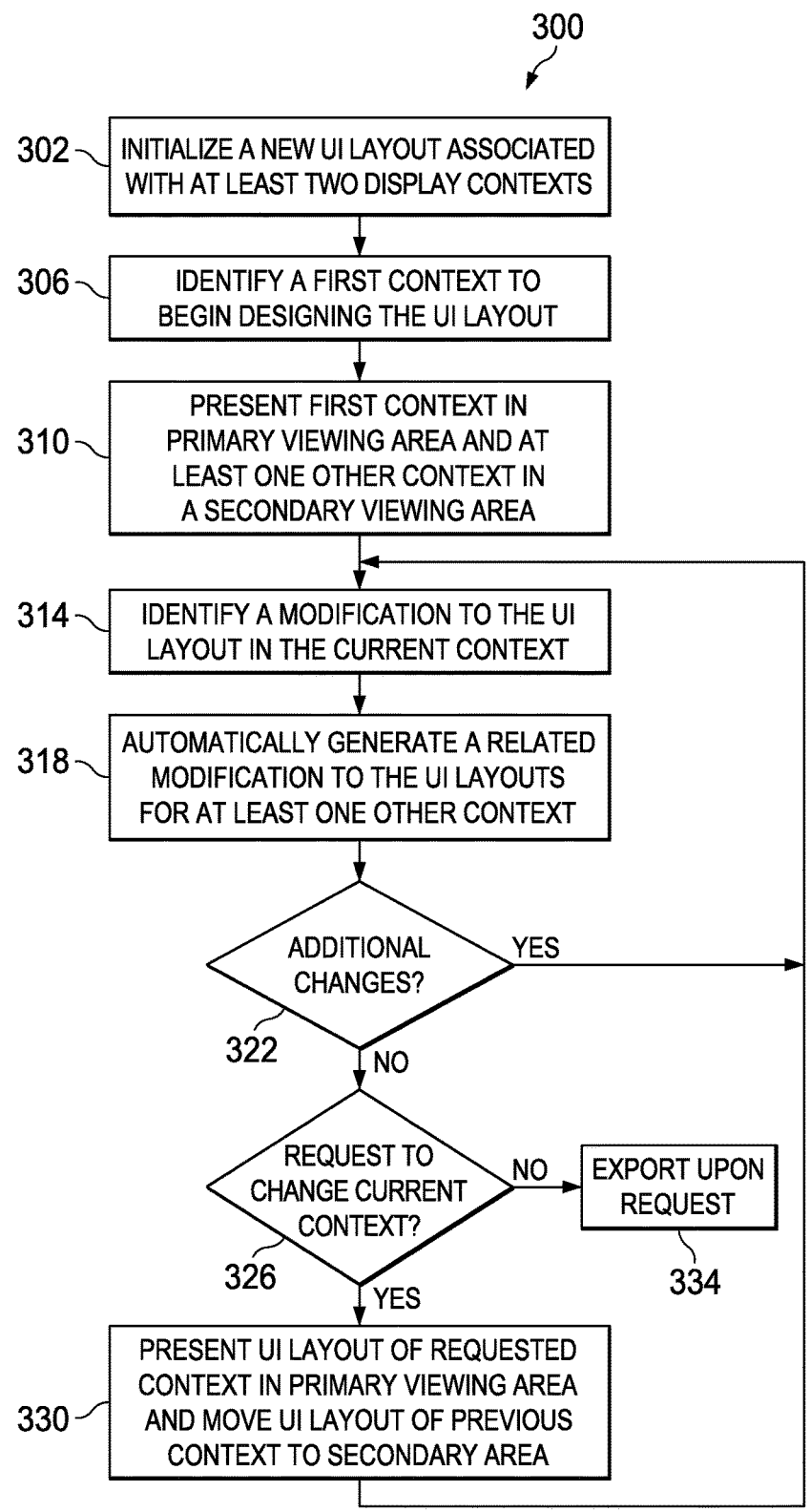
FIG. 3 illustrates a flow diagram describing an example method for presenting modifications to UI designs in a primary context and at least one other context.

FIG. 3 illustrates a flow diagram describing an example method 300 for presenting modifications to UI designs in a primary context and at least one other context. For clarity of presentation, the description that follows generally describes method 300 in the context of FIG. 1. However, it will be understood that method 300 may be performed, for example, by any other suitable system, environment, software, and hardware, or a combination of systems, environments, software, and hardware, as appropriate.

At 302, a new UI layout associated with at least two display contexts is initialized and/or created. The display contexts may be based on different device types, different device models, different perspectives or orientations for a single (or multiple) device(s), or different contexts per different user roles, as well as any other suitable distinctions or separations. At 306, a first context from the at least two contexts is identified in which to begin designing the UI layout. At 310, the identified first context is presented in a primary viewing area associated with the design application and/or interface, with the at least one other context presented in a secondary viewing area. In some instances, two or more additional contexts may be presented in the secondary viewing area. The secondary viewing area may comprise a preview area or panel, and can be used to show preview presentations of related contexts to the currently selected context. In some instances, a preview version of the currently selected context may also be included in the preview area.

At 314, a modification to the UI layout in the current context is identified. In some instances, the modification may be an added UI element, a deleted UI element, or an otherwise modified UI element (e.g., the UI element is moved from one location to another, the UI element's settings or parameters are changed, etc.). At 318, a related modification to the UI layout and corresponding UI element in at least one other context is automatically generated and concurrently presented in the preview area. The related modification to the UI element and the corresponding UI element may be based on a link or association between the particular UI element in the current context and the corresponding UI element in the at least one other context.

At 322, a determination is made as to whether additional changes to the current context are identified. If so, method 300 returns to 314, where the new modification is identified. If not, however, method 300 continues to 326, where a determination is made as to whether a request is received to change the current context presented in the primary display or canvas. In some instances, a request to change the current context may occur by receiving a user selection of a particular context preview in the preview, or secondary, area. Other suitable requests to change the current context may also be used, including a selection from a drop-down or other menu. If no request is received, method 300 may optionally continue at 334. At 334, an export request may be received, and design code corresponding to a requested format may be provided or made available to the requesting user and/or application. If, however, a request to change the current context is received at 326, method 300 continues at 330, where the UI layout of the newly requested context is presented in the primary viewing area. Concurrently, the prior context (i.e., the previous "current" context) is presented in the secondary area. In some instances, the preview of the newly selected context may be replaced by the previous context. In other instances, each of the contexts may always be included in the secondary area, regardless of the current context. In those instances, no major changes to the secondary area may occur, and instead only the context presented in the primary viewing area may change. In some instances, the particular selected context may be highlighted or otherwise distinguished in the secondary area as well as presented in the primary viewing area. Upon presentation of the newly selected context in the primary viewing area, method 300 returns to 314, but with the newly selected context as the current context. Modifications to the newly selected context will then trigger changes in one or more of the other contexts.

Figure 4:
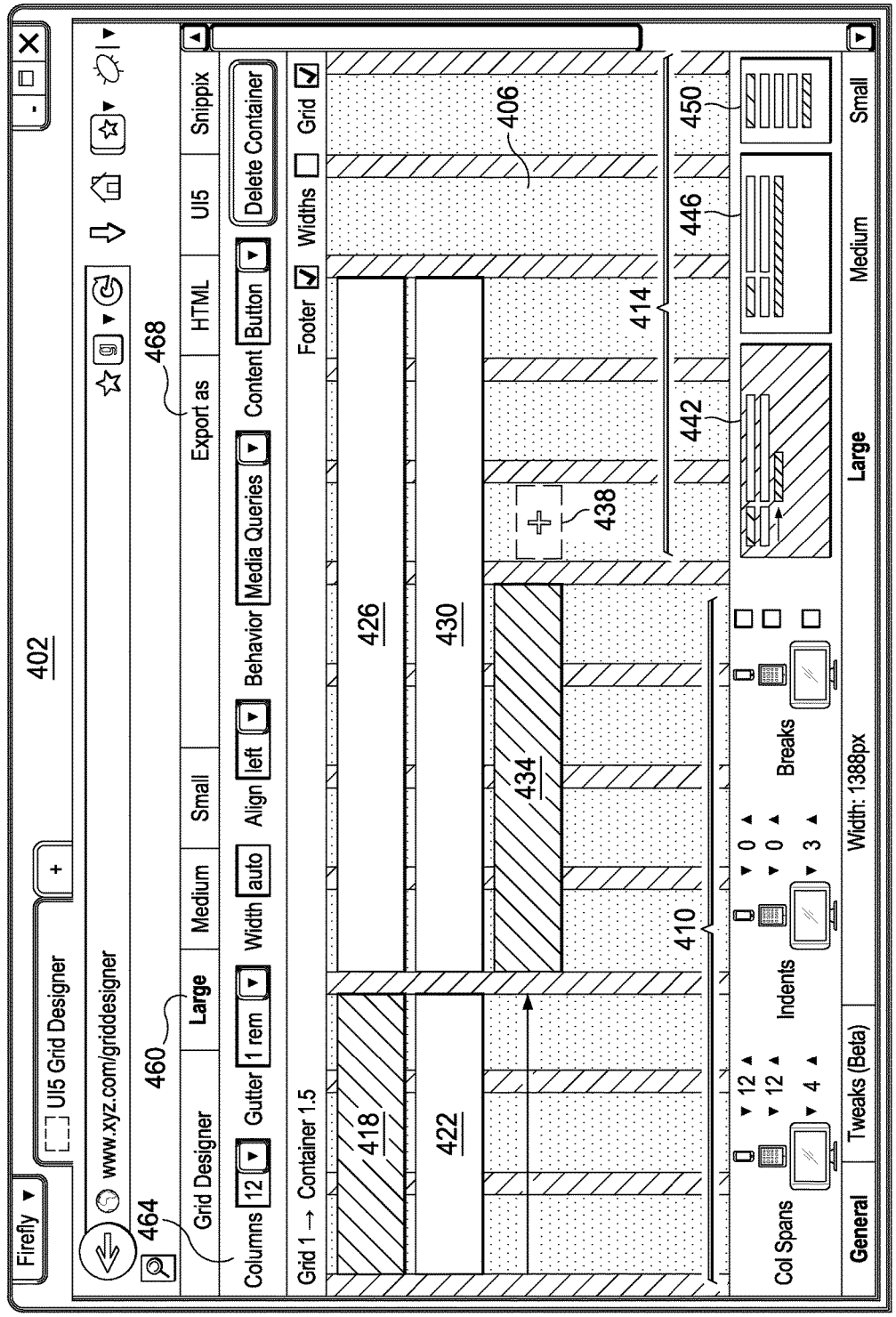
FIG. 4 illustrates an example screenshot of an application for interacting with one or more UI designs, including a first context presented in the primary pane.

FIG. 4 illustrates an example screenshot 400 of an application for interacting with one or more UI designs, including a first context presented in the primary pane. The first context is presented in a canvas 406 within the grid designer application 402, and corresponds to a "large" context (as indicated by tab 460). In some instances, the "large" context corresponds to a desktop context for a particular UI layout. In this example, the grid structure of the canvas 406 is divided into 12 separated columns with a gutter of a fixed and common value (as defined in table 464). The large context is illustrated as including five particular UI elements, 418, 422, 426, 430, and 434. As illustrated, UI element 434 is selected within the canvas, and is related within the context to UI element 418 as identified by the UI elements' respective shading and/or coloring. UI element 434 is indented as defined within settings area 410. A box 438 is provided which an allow users to easily add a new UI element to the context. Such additions may cause the addition of related UI elements within the at least one other context related to the current context. In one example, UI elements 418 and 422 may correspond to labels, UI elements 426 and 430 may correspond to input fields, and UI element 434 may correspond to a submit button.

In the illustrated example, the settings area 410 includes setting information for the large context, a medium context (e.g., a tablet), and a small context (e.g., a smartphone). Any suitable number of contexts may be included in alternative examples. For example, a UI layout may be associated with many different contexts for different types of devices, different devices within a particular device type, and different orientations, among others. The present disclosure is not meant to be limited to a three-context example. The settings for the corresponding contexts' column spans, indents, and line breaks are included in the settings area 410. Alternative, fewer, and/or additional setting values may be included in the settings area 410 in different implementations. Further, while not illustrated, the settings area 410 (or in another suitable location) may include an option to hide a particular UI element in one or more of the contexts. In some instances, the UI element may be hidden in a single context, while in others, the UI element may be hidden in multiple or all of the contexts.

FIG. 4 also includes preview area 414. As illustrated, preview area 414 includes preview representations of the large, medium, and small contexts. As UI elements 434 and 418 are highlighted in the canvas 406, the same UI elements are highlighted in the large context preview 442, and a linked pair of UI elements in the medium (446) and small context previews (450) is highlighted.

Figure 5:
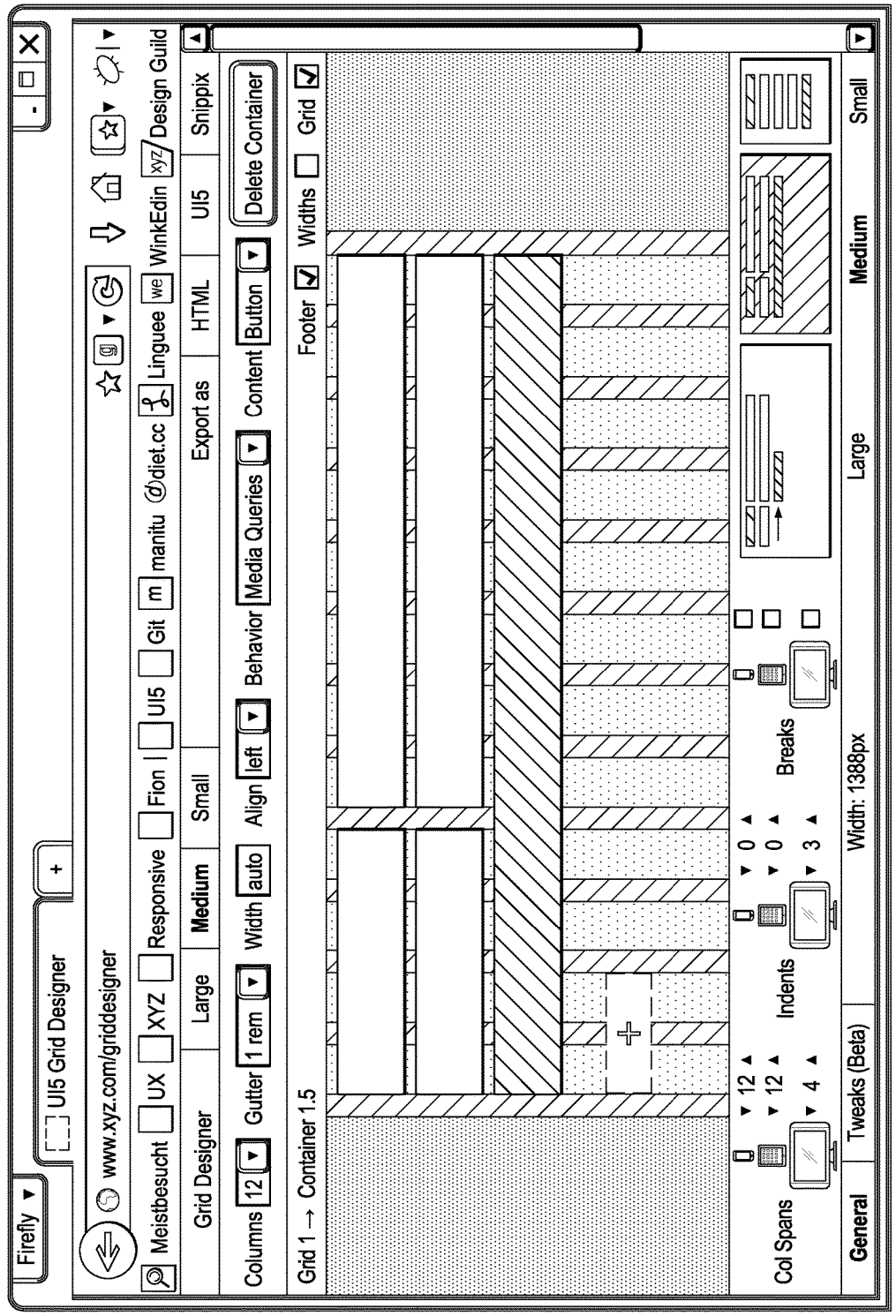
FIG. 5 illustrates an example screenshot of an application for interacting with one or more UI designs, including a second context presented in the primary pane.
Figure 6:
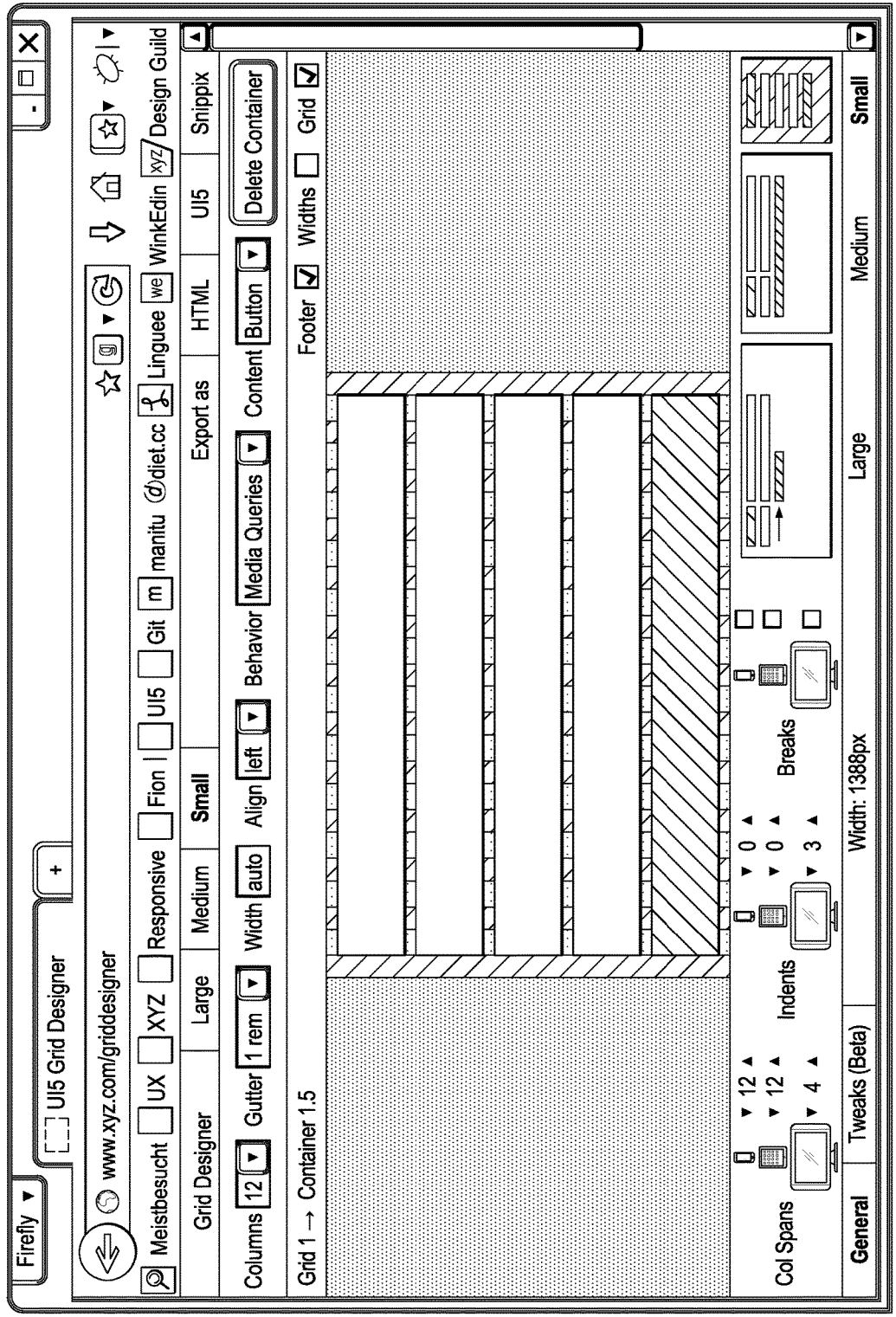
FIG. 6 illustrates an example screenshot of an application for interacting with one or more UI designs, including a third context presented in the primary pane.
Figure 7:
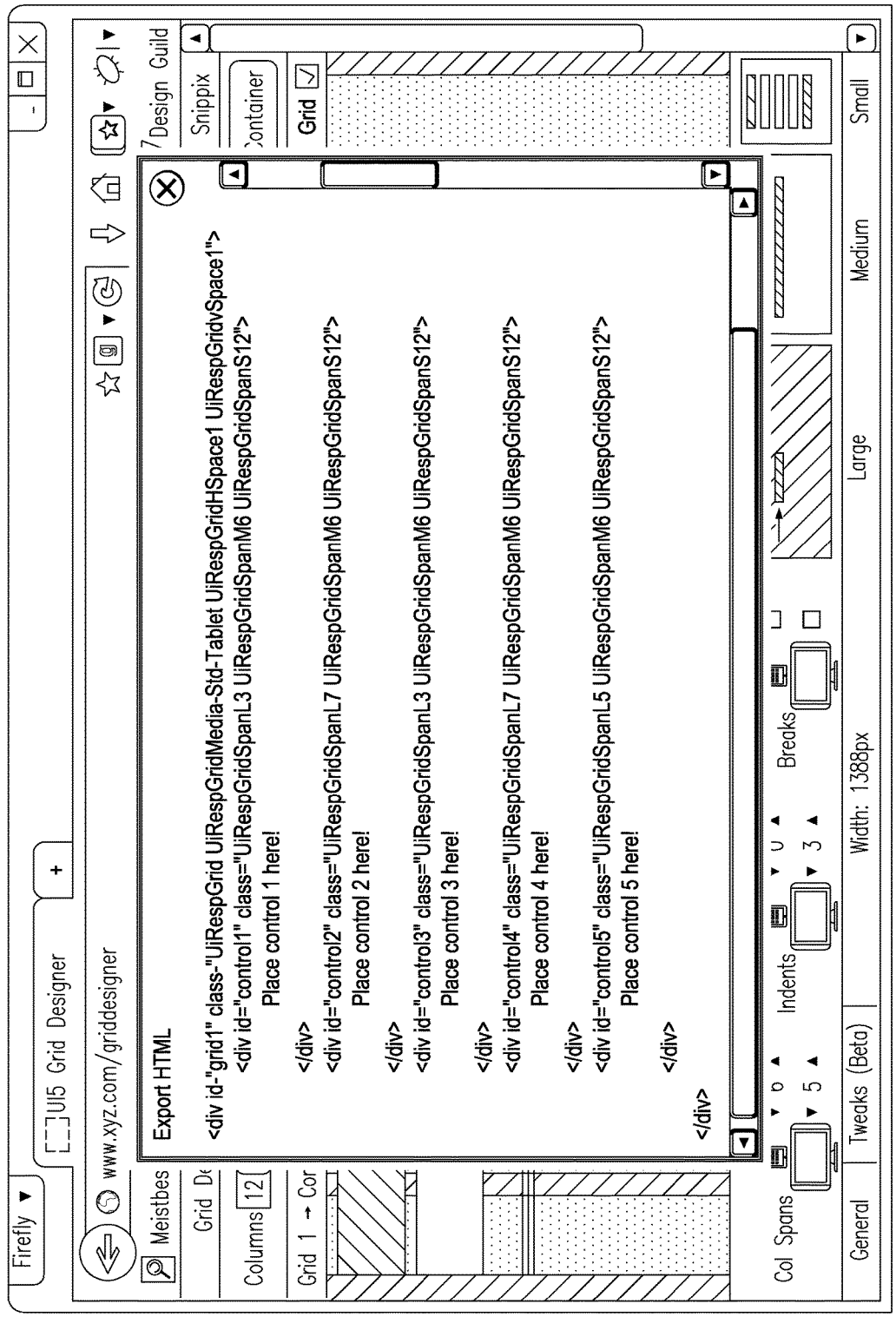
FIGS. 7 and 8 illustrate example code exported from a particular UI design in both HTML and UI5.
Figure 8:
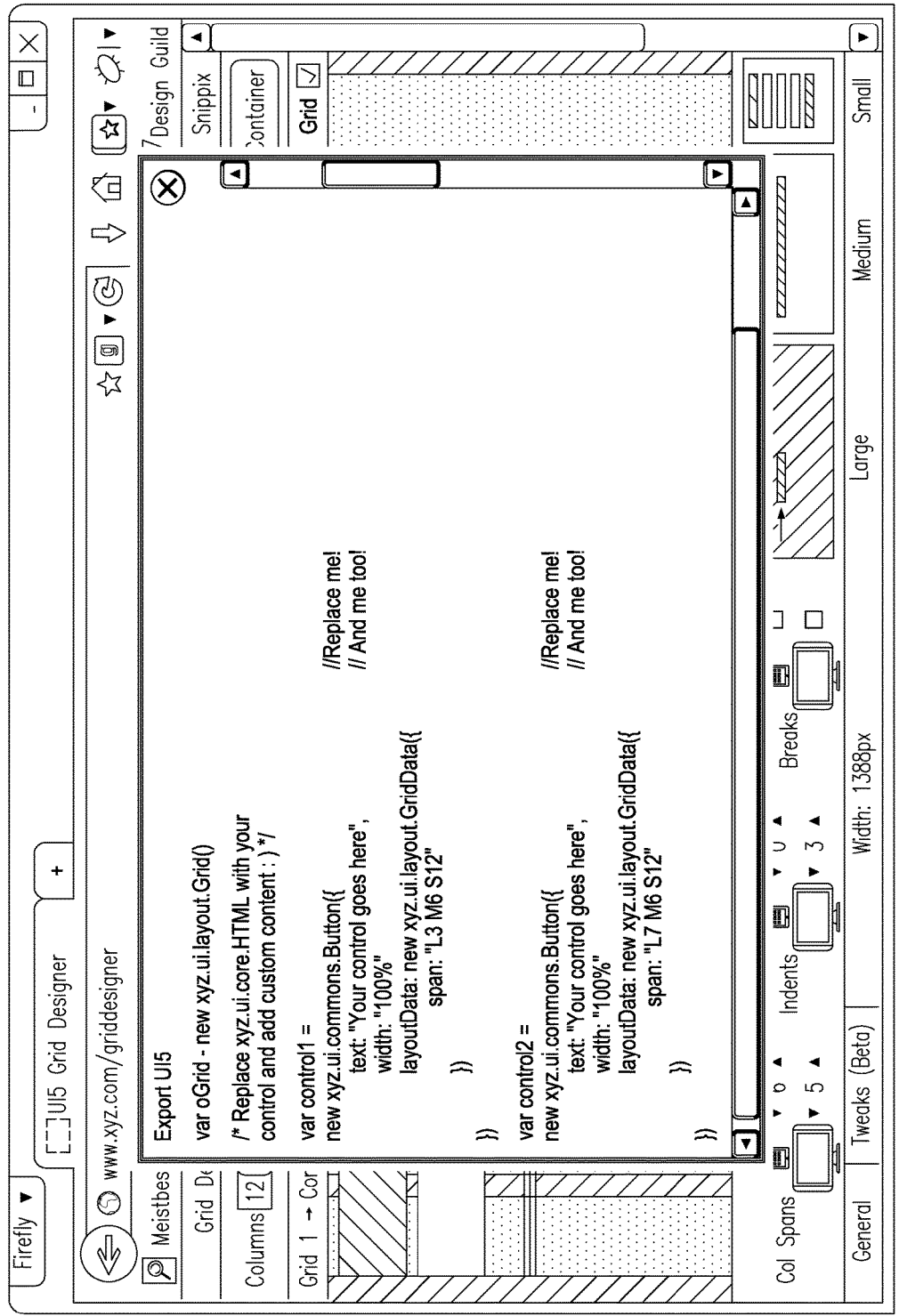

FIG. 4 includes an export button 468, which can in turn allow users to easily export the code of the current context (and in some instances, one or more of the related contexts) in one of several languages and styles. As illustrated, the export choices may include, among others, an HTML-based export, a UI5-based export, and a Snippix-based export. Alternative and additional export types may also be included. FIGS. 7 and 8 illustrate examples of the exported code in HTML and UI5, respectively. FIGS. 5 and 6 present screenshots showing the current context presented in their respective canvases as a medium and small context. These presentations show the alternative sizes of the corresponding screens in the respective contexts and the alternative ordering and layout of the UI elements.

Figure 9:
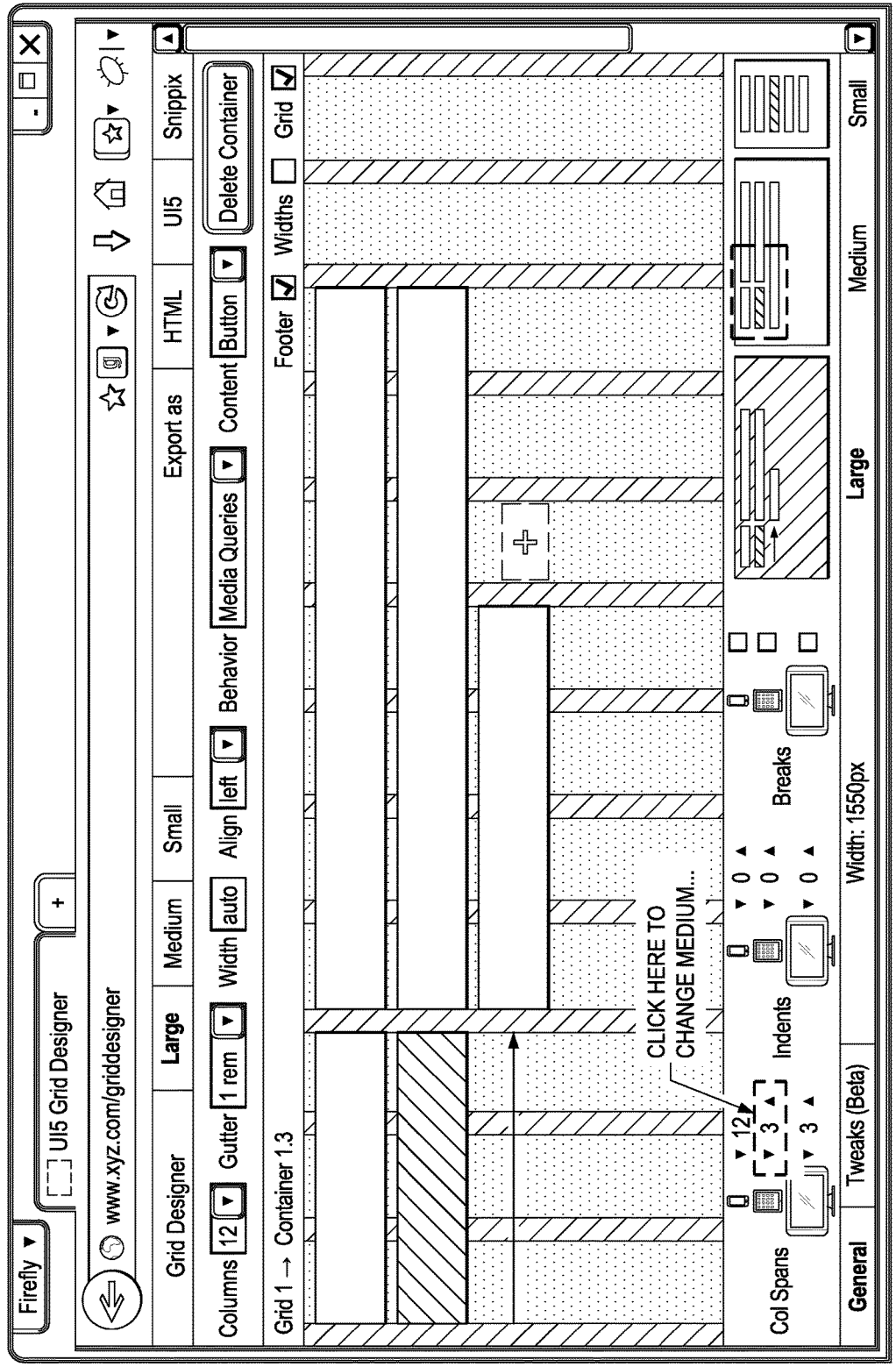
FIGS. 9 through 14 are an example set of screenshots where setting changes are made to a UI design in one or more non-selected contexts.
Figure 10:
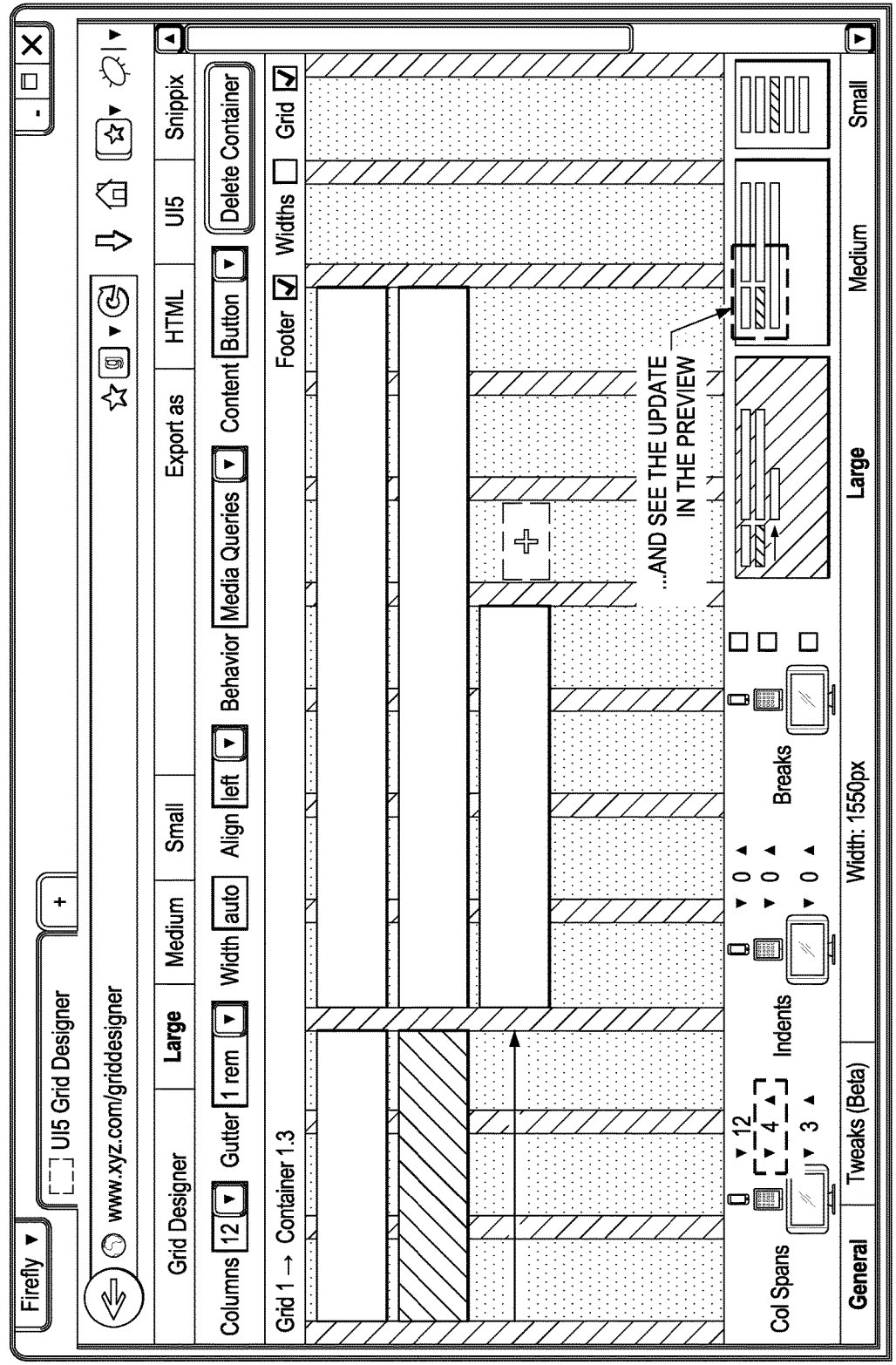
Figure 11:
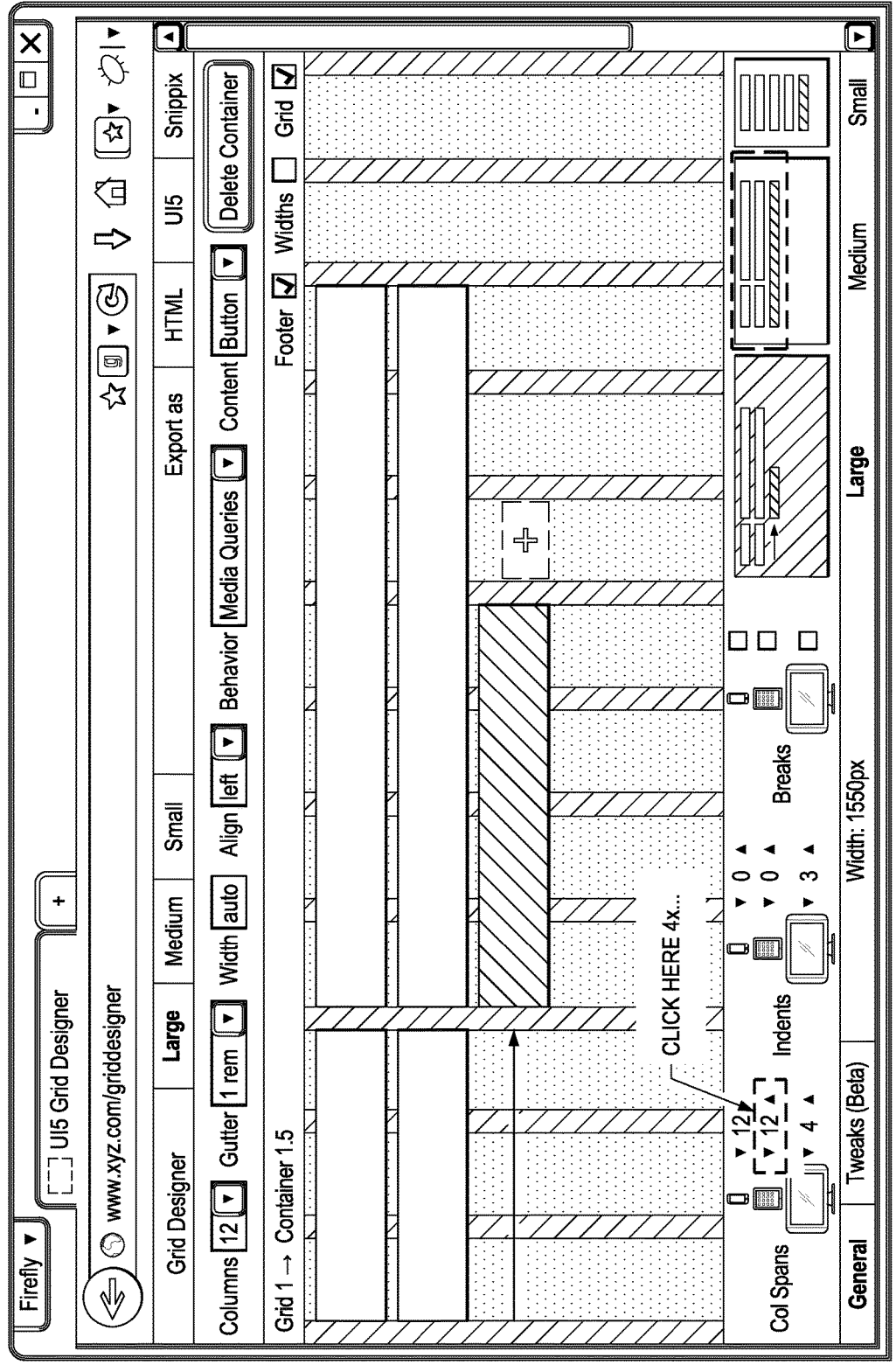
Figure 12:
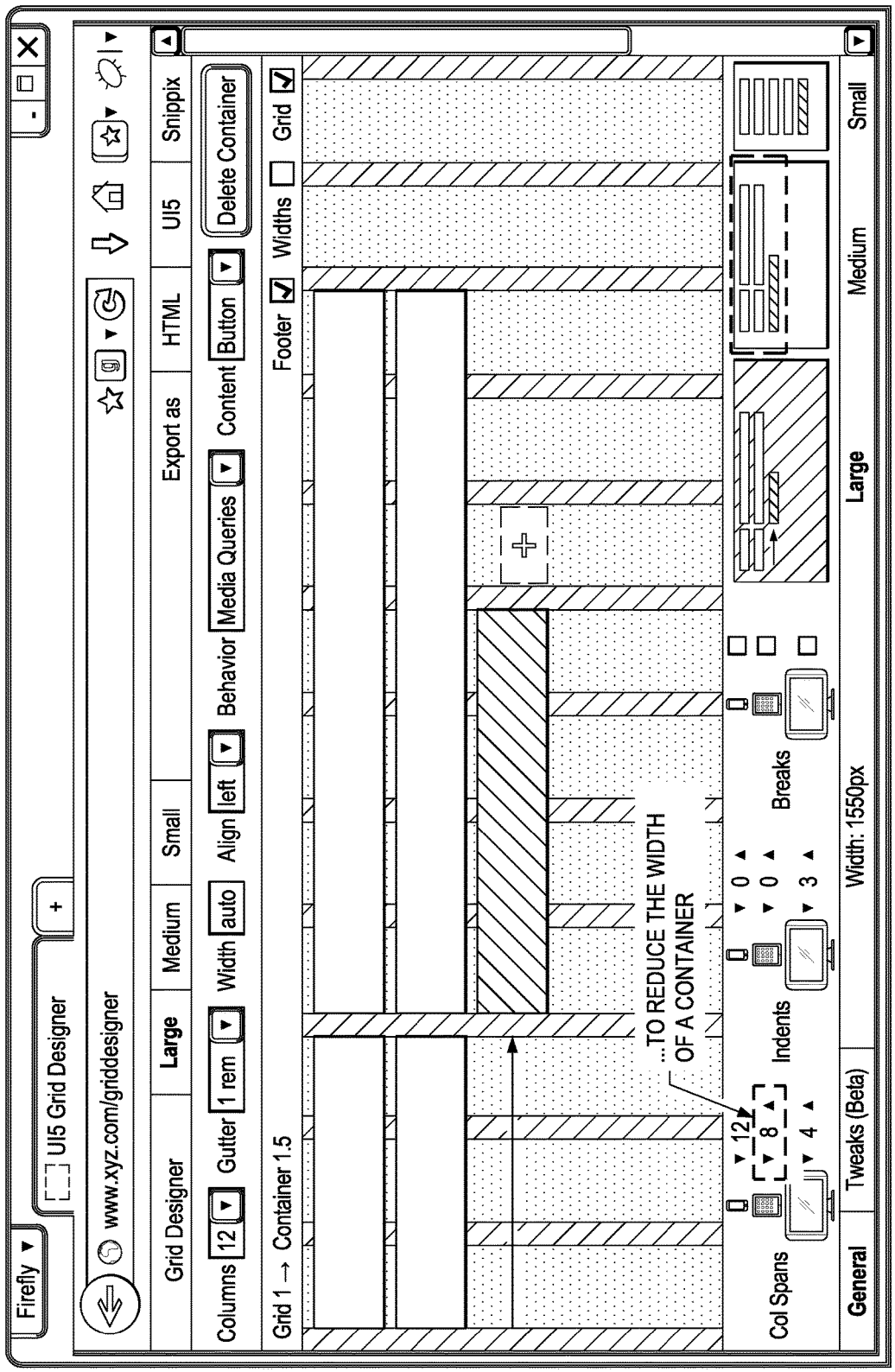
Figure 13:
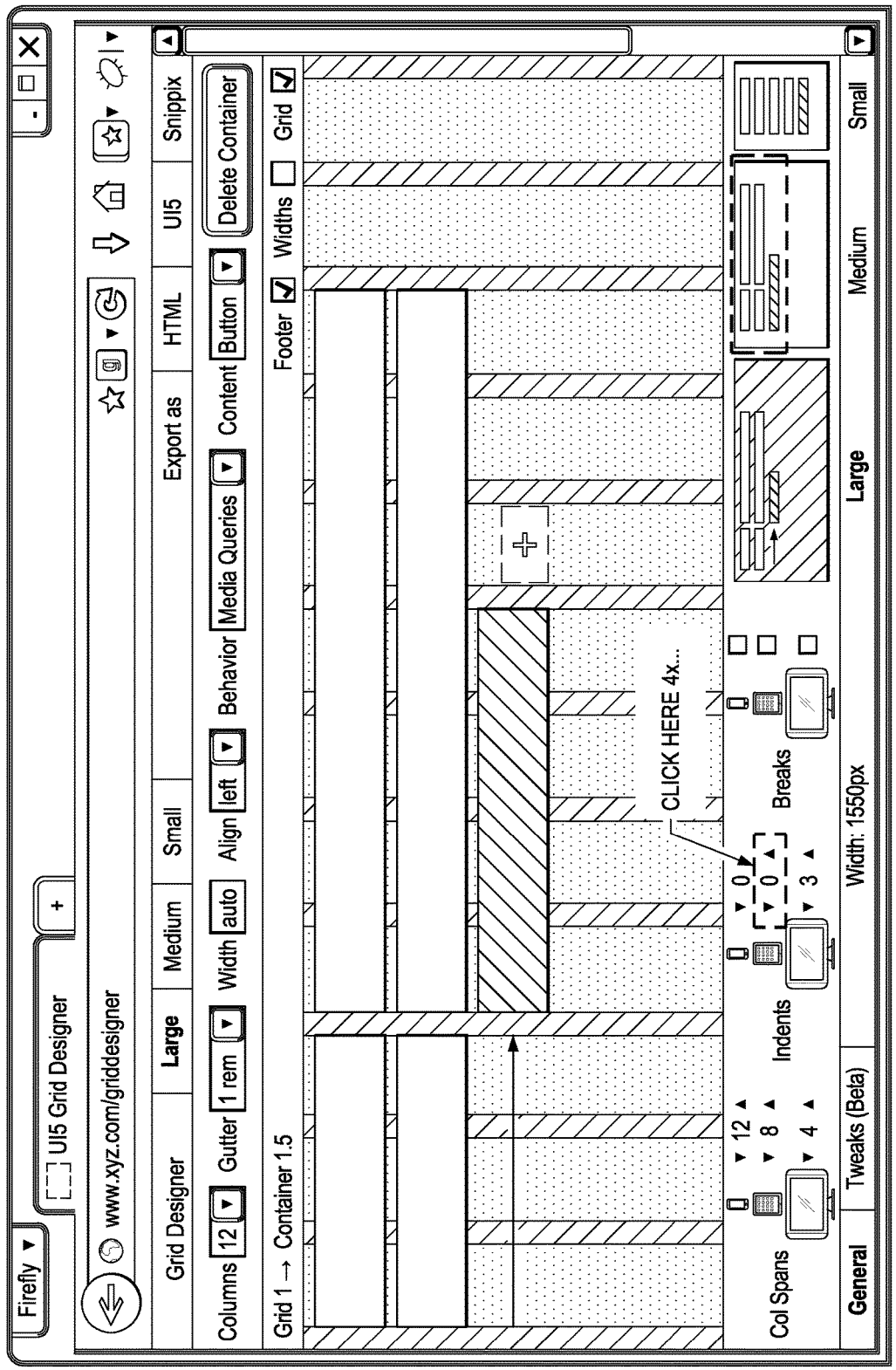
Figure 14:
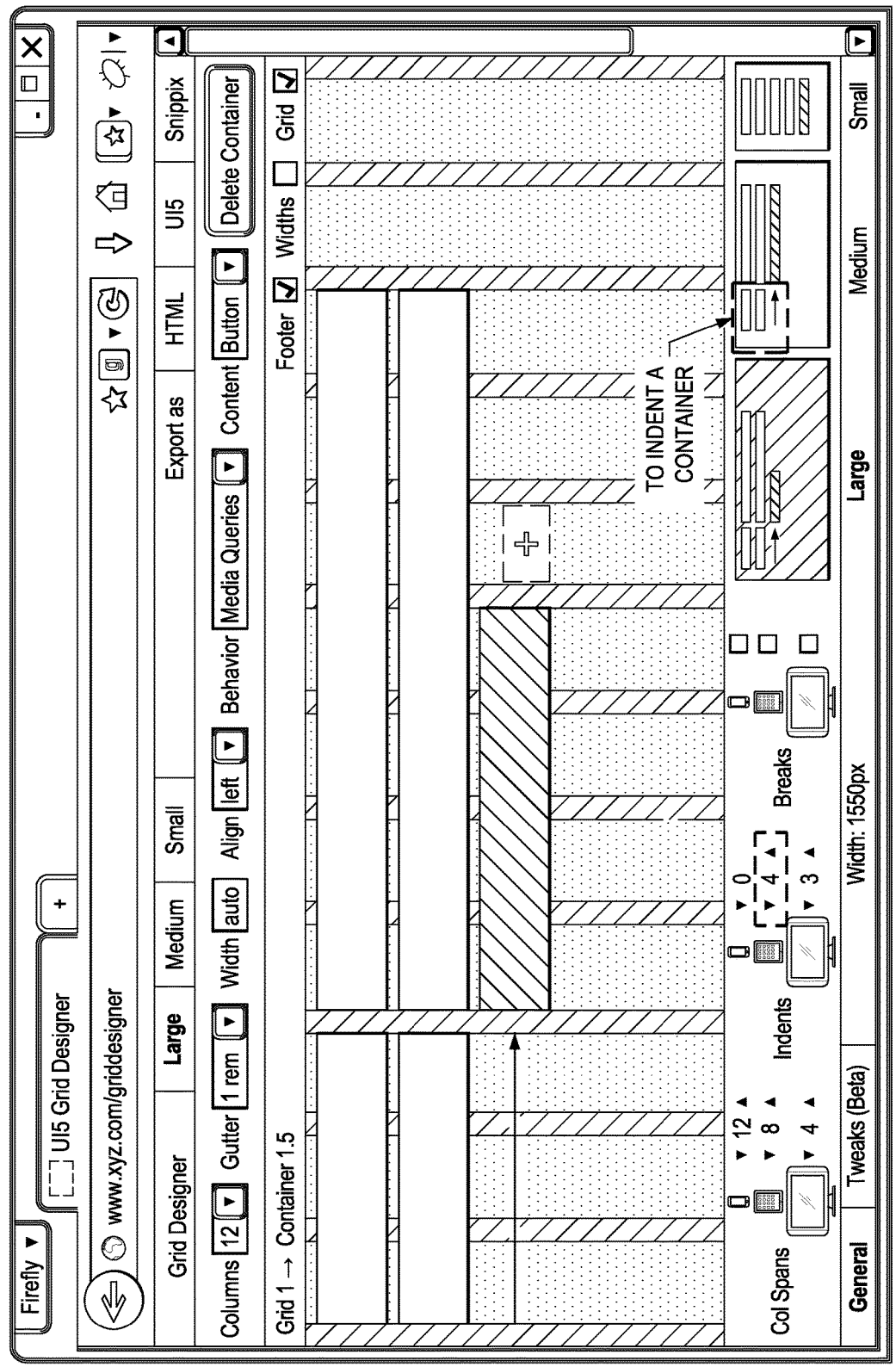

FIGS. 9 through 14 illustrate how modifications to a particular setting in the settings panel can provide immediately feedback on changes to a particular context, even where the context modified is not the currently presented context in the primary viewing area. In FIG. 9, the large context is presented in the primary viewing area, while previews of the large, medium, and small contexts are presented in the preview area. As shown, a modification is made to the column span of the UI element in the medium (or tablet) context linked to the currently selected UI element in the primary viewing area is modified in the settings area. As illustrated in FIG. 10, the corresponding change is reflected in the preview version of the medium context with a wider column span for the corresponding UI element. In FIG. 11, the column span is increased further with the preview area for the medium context concurrently showing the effects of the change. Similarly, the column span is decreased in FIG. 12, and a corresponding decrease in the column span of the UI element in the medium context is shown. FIGS. 13 and 14 show a similar change to a UI element's indention in the medium context setting and its effect on the corresponding preview of the medium context.

FIGS. 15 through 18 are an example set of screenshots illustrating automatic modifications occurring in at least one non-selected context as a result of a movement of one or more UI elements from an initial location to a new location within a selected context. Specifically, FIGS. 15 through 18 provide an illustration of how a modification to the layout in a first context can affect the presentation in a second context.

Figure 15:
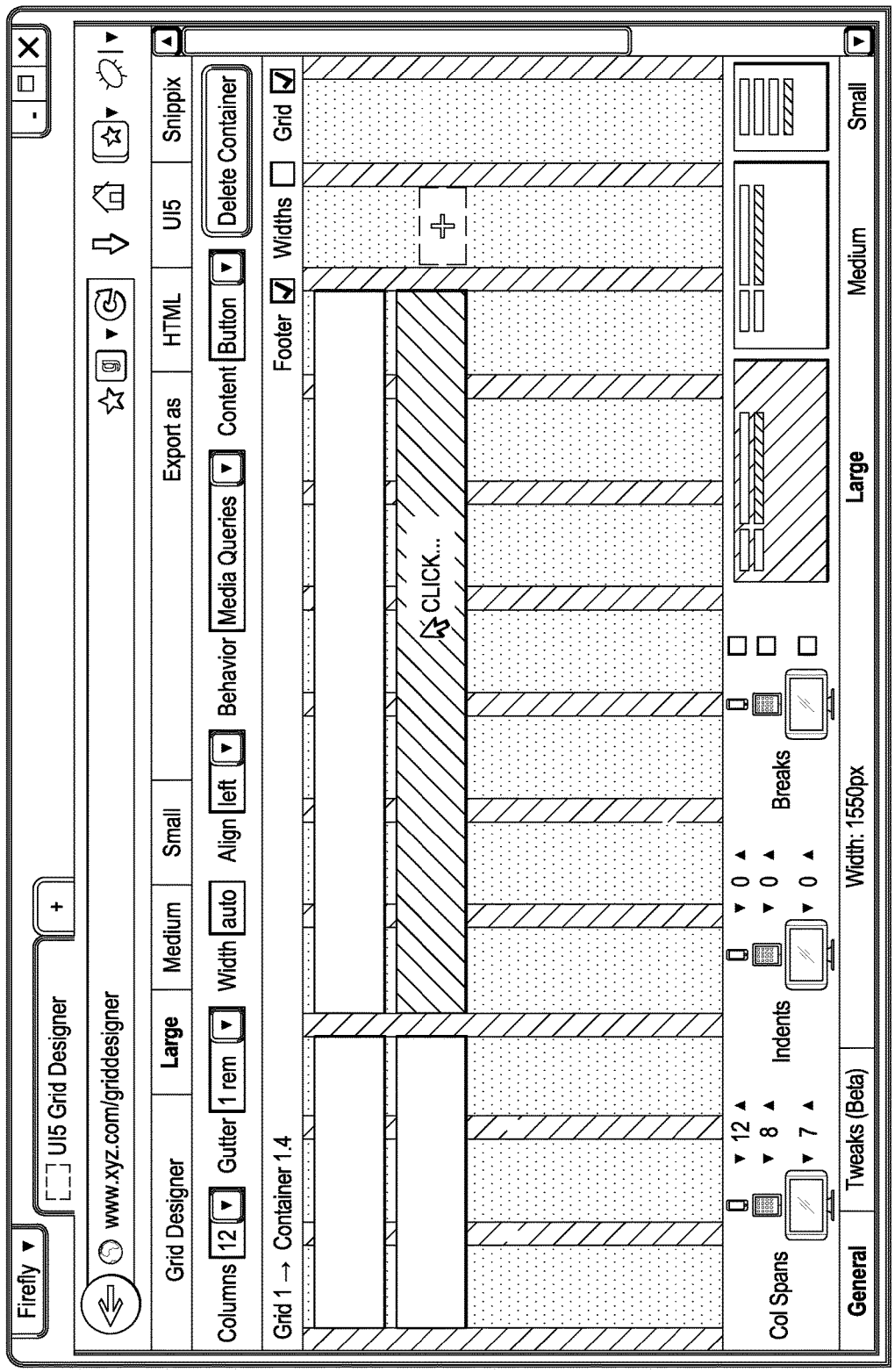
FIGS. 15 through 18 are an example set of screenshots illustrating automatic modifications occurring in at least one non-selected context as a result of a modification to the UI design of a selected context.
Figure 16:
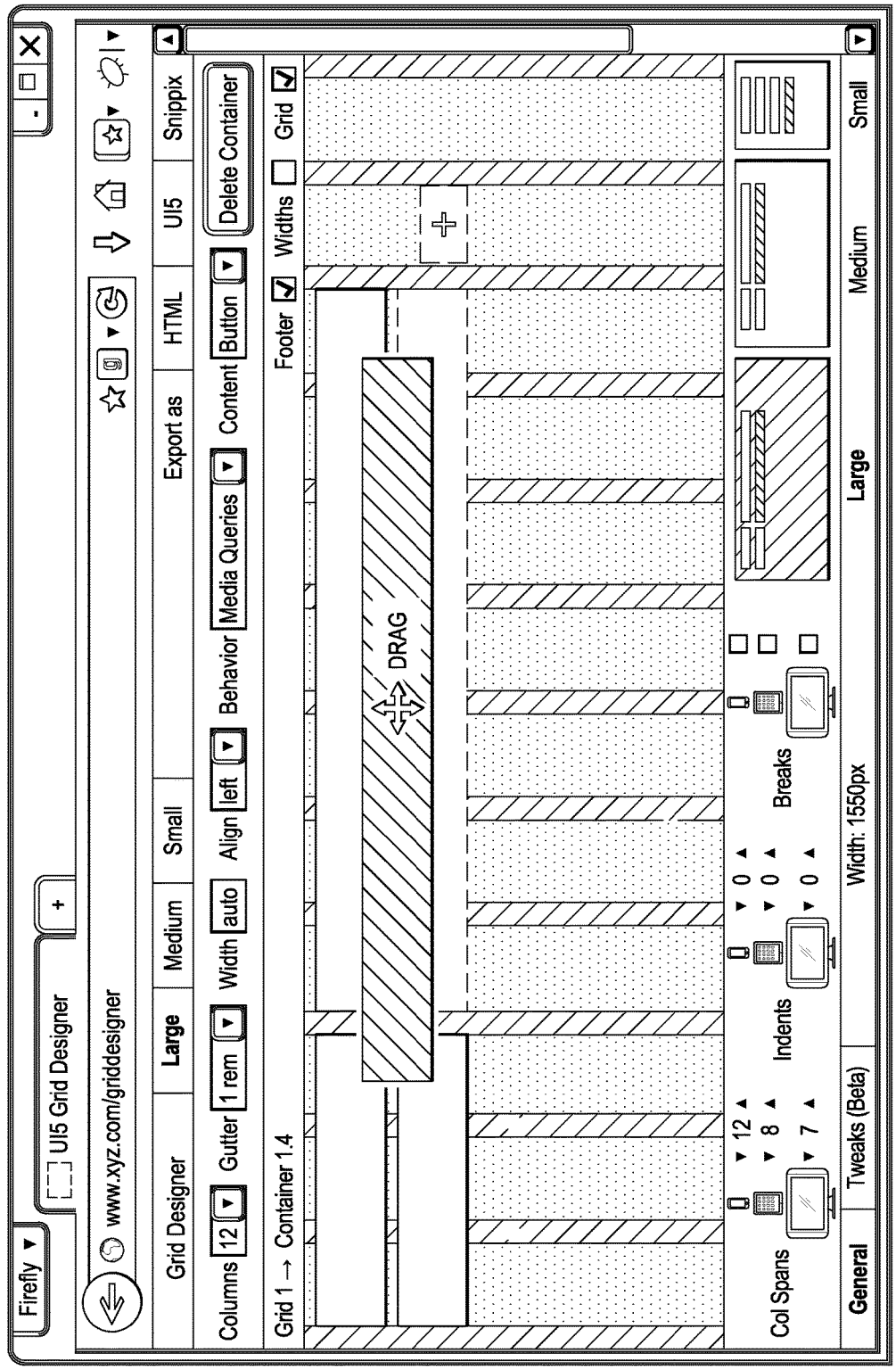
Figure 17:
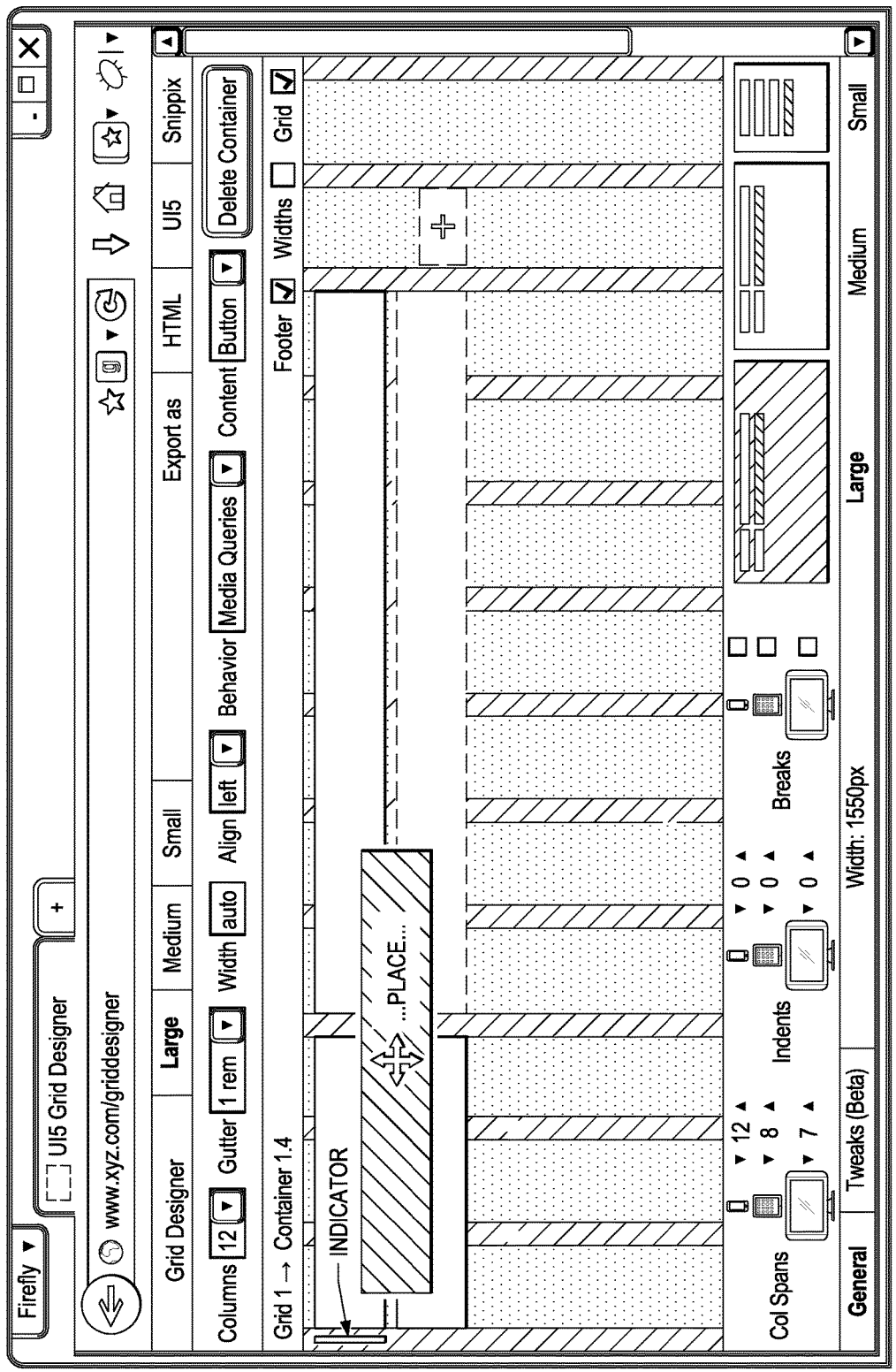
Figure 18:
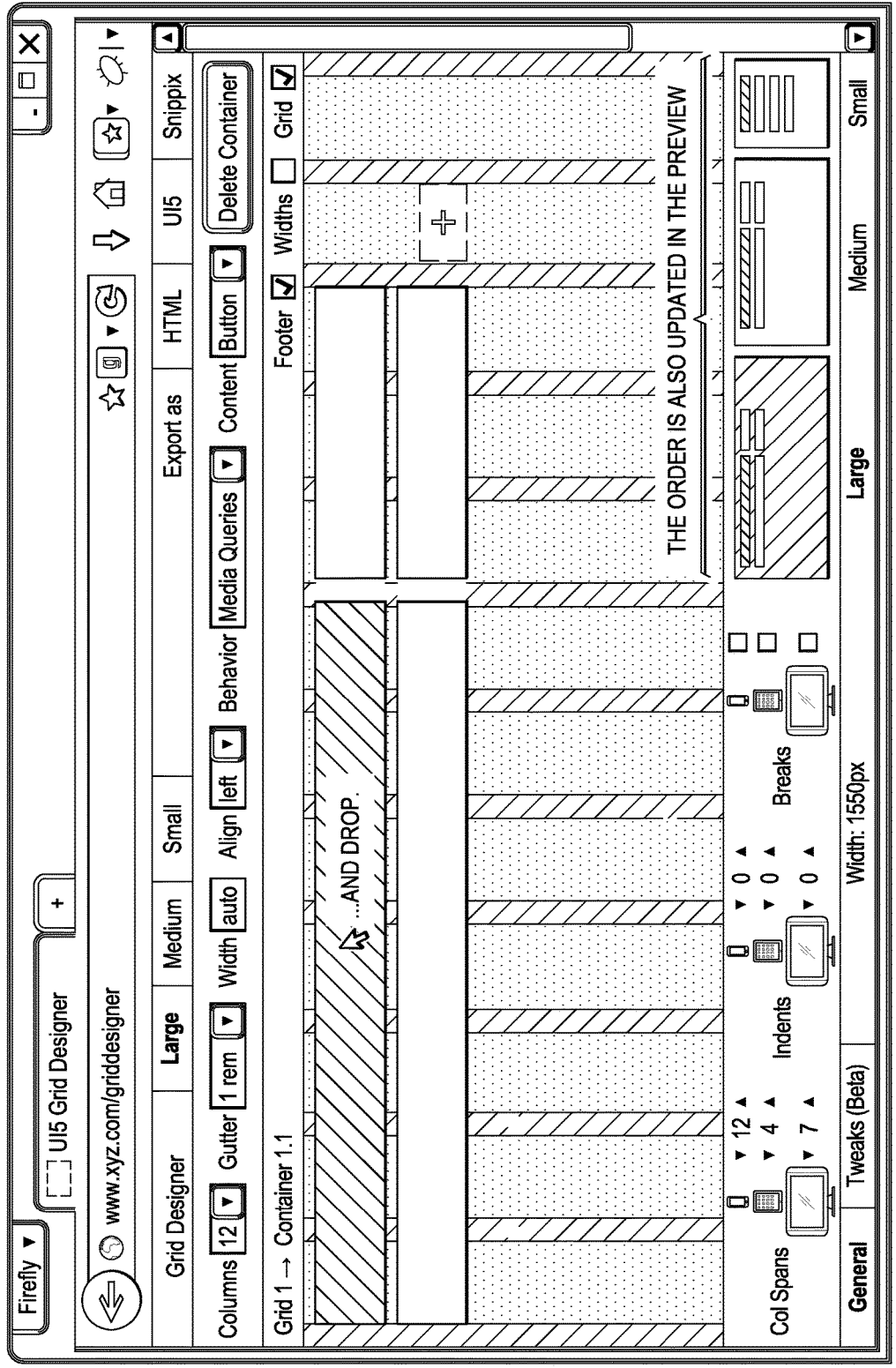

As illustrated in FIGS. 15 through 18, a particular UI element is clicked, dragged, and dropped from a first location to a new second location within the canvas, causing a modification to the overall layout of the UI design. In FIGS. 15 through 17, the selected UI element is identified by highlighting in the canvas of the primary viewing area. Similarly, the linked UI elements in the other contexts are also shown as highlighted. When the movement is complete in FIG. 18, the other contexts are automatically updated to show a similar or related movement of the linked UI elements to a location based on the completed movement in the primary viewing area and for the current context. A set of UI design rules and parameters can be used to determine the appropriate and corresponding actions to perform in additional contexts when a particular UI element or set of elements is moved from, modified in, added to, or deleted from the current context. When the modification is made, the effects of the change can then be immediately recognized in the one or more other contexts by considering the updated preview version of the other contexts.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method executed by one or more processors, the method comprising:
presenting a user interface (UI) layout of a particular application UI for a first context in a primary display and at least one miniature UI layout of the same particular application UI for a plurality of contexts including the first context in a secondary display area adjacent to the primary display, each UI layout including a plurality of UI elements, at least a portion of the UI elements included in the first context included in the plurality of contexts in the secondary display area;
receiving, from a user, a selection of a particular UI layout from the at least one miniature UI layouts presented in the secondary display area, the particular UI layout associated with a second context different from the first context;
presenting the particular UI layout for the selected second context in the primary display in response to the received selection from the user;
identifying a modification to at least one UI element in the context presented in the primary display;
determining at least one modification to the at least one miniature UI layout in at least one of the contexts in the secondary display area, including the first context, based on the modification of the at least one UI element in the second context in the primary display, wherein the determined at least one modification to the at least one miniature UI layout in at least one of the contexts in the secondary display area is based on a set of responsive UI design rules specific to each of the at least one contexts other than the context presented in the primary display, and wherein the at least one modification includes a first modification to at least one context other than to the context presented in the primary display different than the identified modification to the at least one UI element in the context presented in the primary display;
automatically performing the at least one determined modification to the UI layout in at least one of the plural contexts in the secondary display area; and
presenting an updated UI layout for the context in the primary display and an updated miniature UI layout for the at least one of the plural contexts in the secondary display area.

2. The method of claim 1, wherein the primary display includes a responsive grid for designing UI layouts.

3. The method of claim 1, wherein the at least one modified UI element in the context presented in the primary display is associated with at least one UI element in at least one of the plural contexts in the secondary display area.

4. The method of claim 3, wherein determining at least one modification to the miniature UI layout in at least one of the plural contexts in the secondary display area comprises determining at least one modification to the at least one UI element in the at least one of the plural contexts in the secondary display area associated with the at least one modified UI element in the context in the primary display, and wherein automatically performing the at least one determined modification to the miniature UI layout in the at least one of the plural contexts in the secondary display area comprises automatically performing the at least one determined modification to the at least one UI element in the at least one of the plural contexts in the secondary display area.

5. The method of claim 1, wherein the secondary display area comprises a preview area providing a miniature representation of the UI layouts for the plural contexts as compared to the UI layout in the context presented in the primary display.

6. The method of claim 5, further comprising:
identifying a selection of a particular UI element in the presentation of the context in the primary display;
determining at least one UI element from the at least one of the plural contexts in the secondary display area associated with the selected UI element in the context presented in the primary display; and
emphasizing the at least one determined UI element from the at least one of the plural contexts presented in the preview area.

7. The method of claim 1, wherein the modification to the at least one UI element in the context presented in the primary display includes at least one of a deletion of the at least one UI element from the context presented in the primary display, a modification of a setting associated with the at least one UI element in the context presented in the primary display, or a movement of the at least one UI element from the context presented in the primary display from a first position to a second position.

8. A system, comprising:
at least one processor;
a computer-readable storage medium coupled to the processor having instructions stored thereon which, when executed by the at least one processor, cause the at least one processor to perform operations comprising:
presenting a user interface (UI) layout of a particular application UI for a first context in a primary display and at least one miniature UI layout of the same particular application UI for a plurality of contexts including the first context presented in the primary display in a secondary display area adjacent to the primary display, each UI layout including a plurality of UI elements, at least a portion of the UI elements included in the first context included in the plurality of contexts in the secondary display area;
receiving, from a user, a selection of a particular UI layout from the at least one miniature UI layouts presented in the secondary display area, the particular UI layout associated with a second context different from the first context;
presenting the particular UI layout for the selected second context in the primary display in response to the received selection from the user;
identifying a modification to at least one UI element in the context presented in the primary display;
determining at least one modification to the at least one miniature UI layout in at least one of the contexts in the secondary display area, including the first context, based on the modification of the at least one UI element in the second context in the primary display, wherein the determined at least one modification to the at least one miniature UI layout in at least one of the contexts in the secondary display area is based on a set of responsive UI design rules specific to each of the at least one contexts other than the context presented in the primary display, and wherein the at least one modification includes a first modification to at least one context other than to the context presented in the primary display different than the identified modification to the at least one UI element in the context presented in the primary display;

automatically performing the at least one determined modification to the UI layout in at least one of the plural contexts in the secondary display area; and presenting an updated UI layout of the particular application UI for the context in the primary display and an updated miniature UI layout of the particular application UI for the at least one of the plural contexts in the secondary display area.

9. The system of claim 8, wherein the primary display includes a responsive grid for designing UI layouts.

10. The system of claim 8, wherein the at least one modified UI element in the context presented in the primary display is associated with at least one UI element in at least one of the plural contexts in the secondary display area.

11. The system of claim 10, wherein determining at least one modification to the miniature UI layout in at least one of the plural contexts in the secondary display area comprises determining at least one modification to the at least one UI element in the at least one of the plural contexts in the secondary display area associated with the at least one modified UI element in the context in the primary display, and wherein automatically performing the at least one determined modification to the miniature UI layout in the at least one of the plural contexts in the secondary display area comprises automatically performing the at least one determined modification to the at least one UI element in the at least one of the plural contexts in the secondary display area.

12. The system of claim 8, wherein the secondary display area comprises a preview area providing a miniature representation of the UI layouts for the plural contexts as compared to the UI layout in the context presented in the primary display.

13. The system of claim 12, the operations further comprising:

identifying a selection of a particular UI element in the presentation of the context in the primary display;

determining at least one UI element from the at least one of the plural contexts in the secondary display area associated with the selected UI element in the context presented in the primary display; and emphasizing the at least one determined UI element from the at least one of the plural contexts presented in the preview area.

14. The system of claim 8, wherein the modification to the at least one UI element in the context presented in the primary display includes at least one of a deletion of the at least one UI element from the context presented in the primary display, a modification of a setting associated with the at least one UI element in the context presented in the primary display, or a movement of the at least one UI element from the context presented in the primary display from a first position to a second position.

15. A computer program product embodied in a non-transitory computer-readable storage medium and comprising instructions for execution by at least one processor, wherein the instructions instruct the at least one processor to:

present a user interface (UI) layout of a particular application UI for a first context in a primary display and at least one miniature UI layout of the same particular application UI for a plurality of contexts including the first context in a secondary display area adjacent to the primary display, each UI layout including a plurality of UI elements, at least a portion of the UI elements included in the first context included in the plurality of contexts in the secondary display area;

receive from a user, a selection of a particular UI layout from the at least one miniature UI layouts presented in the secondary display area, the particular UI layout associated with a second context different from the first context;

present the particular UI layout for the selected second context in the primary display in response to the received selection from the user;

identify a modification to at least one UI element in the context presented in the primary display;

determine at least one modification to the at least one miniature UI layout in at least one of the contexts in the secondary display area, including the first context, based on the modification of the at least one UI element in the second context in the primary display, wherein the determined at least one modification to the at least one miniature UI layout in at least one of the contexts in the secondary display area is based on a set of responsive UI design rules specific to each of the at least one contexts other than the context presented in the primary display, and wherein the at least one modification includes a first modification to at least one context other than to the context presented in the primary display different than the identified modification to the at least one UI element in the context presented in the primary display;

automatically perform the at least one determined modification to the UI layout in at least one of the plural contexts in the secondary display area; and present an updated UI layout of the particular application UI for the context in the primary display and an updated miniature UI layout of the particular application UI for the at least one of the plural contexts in the secondary display area.

16. The computer program product of claim 15, wherein the at least one modified UI element in the context presented in the primary display is associated with at least one UI element in at least one of the plural contexts in the secondary display area.

17. The computer program product of claim 16, wherein determining at least one modification to the miniature UI layout in at least one of the plural contexts in the secondary display area comprises determining at least one modification to the at least one UI element in the at least one of the plural contexts in the secondary display area associated with the at least one modified UI element in the context in the primary display, and wherein automatically performing the at least one determined modification to the miniature UI layout in the at least one of the plural contexts in the secondary display area comprises automatically performing the at least one determined modification to the at least one UI element in the at least one of the plural contexts in the secondary display area.

18. The computer program product of claim 15, wherein the secondary display area comprises a preview area providing a miniature representation of the UI layouts for the plural contexts as compared to the UI layout in the context presented in the primary display.

19. The method of claim 1, wherein the UI layouts of the particular application UI for the first context and for the plurality of contexts represent UI layouts of the same particular application UI in different device types or device orientations.

* * * * *